United States Patent
Khan et al.

(10) Patent No.: US 12,516,712 B2
(45) Date of Patent: Jan. 6, 2026

(54) RESPONSE CONTROL OF BEAM VIBRATIONS WITH A RECIPROCATING DYNAMIC DAMPER

(71) Applicant: KING FAHD UNIVERSITY OF PETROLEUM AND MINERALS, Dhahran (SA)

(72) Inventors: Sikandar Khan, Dhahran (SA); Salem Bashmal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 838 days.

(21) Appl. No.: 17/871,481

(22) Filed: Jul. 22, 2022

(65) Prior Publication Data
US 2024/0026946 A1  Jan. 25, 2024

(51) Int. Cl.
*F16F 7/104*  (2006.01)
*F16F 7/10*  (2006.01)
*F16F 15/03*  (2006.01)

(52) U.S. Cl.
CPC ............ *F16F 7/104* (2013.01); *F16F 7/1011* (2013.01); *F16F 15/03* (2013.01)

(58) Field of Classification Search
CPC ....... F16F 7/1005; F16F 7/104; E04H 9/0215; E01D 19/00
See application file for complete search history.

(56) References Cited

U.S. PATENT DOCUMENTS

| | | | | |
|---|---|---|---|---|
| 5,564,536 A | * | 10/1996 | Lai | F16F 7/104 52/167.2 |
| 5,915,508 A | * | 6/1999 | Lai | F16F 15/085 52/167.2 |
| 2023/0279917 A1 | * | 9/2023 | Seeley | F16F 7/104 188/380 |

FOREIGN PATENT DOCUMENTS

| | | | | |
|---|---|---|---|---|
| CN | 113901544 A | | 1/2022 | |
| CN | 114607733 A | * | 6/2022 | ........... F16M 11/425 |
| CN | 117107612 A | * | 11/2023 | ............. E01D 19/00 |

(Continued)

OTHER PUBLICATIONS

Machine translation of Jia (CN 114607733) (no date).*

(Continued)

*Primary Examiner* — Nicholas J Lane
(74) *Attorney, Agent, or Firm* — Oblon, McClelland, Maier & Neustadt, L.L.P.

(57) ABSTRACT

A dynamic damper system, method, and non-transitory computer readable medium for damping vibrations in a beam structure. The dynamic damper system includes a beam with a first and a second fixed end having a width and a thickness; a first and a second flexible support, each having a spring constant $k_l$ connected to the beam beneath the first and the second end, respectively; a first and a second torsional spring, each having a spring constant $k_\theta$ connected to the first and the second end, respectively; a moving load configured to traverse the beam reciprocally between the ends and generate first vibrations in the beam; and a dynamic linear spring mass damper connected to the beam is configured to travel reciprocally between the ends and generate second vibrations in the beam which are 180 degrees out of phase with the first vibrations in the beam generated by the moving load.

20 Claims, 20 Drawing Sheets

(56) References Cited

FOREIGN PATENT DOCUMENTS

| CN | 119434087 A | * | 2/2025 | ........... E04H 9/0237 |
| KR | 10-0941809 B1 | | 2/2010 | |

OTHER PUBLICATIONS

English-language abstract of Jia (CN 117107612) (no date).*
English-language abstract of Wang (CN119434097) (no date).*
Zhang, et al. ; The vibration frequency analysis of the screw feeding system with spring supports ; Journal of Vibroengineering, vol. 19, Issue 3 ; pp. 1479-1493 ; May 15, 2017 ; 13 Pages.
Hirzinger, et al. ; Dynamic response of a non-classically damped beam with general boundary conditions subjected to a moving mass-spring-damper system ; International Journal of Mechanical Sciences 185 ; 2020 ; 14 Pages.
Mahapatra, et al. ; Dynamic Response of a Damped Euler-Bernoulli Beam Having Elastically Restrained Boundary Supports ; SpringerLink ; Sep. 25, 2018 ; Abstract Only ; 6 Pages.
Yang, et al. ; Dynamic behavior of bridge-erecting machine subjected to moving mass suspended by wire ropes ; Applied Mathematics and Mechanics (English Edition) ; Nov. 27, 2015 ; 9 Pages.
Mouser Electronics ; Analog Devices LTC3588EMSE-2#TRPBF ; https://www.mouser.com/ProductDetail/Analog-Devices/LTC3588EMSE-2TRPBF?fs=hVkxf5c3xu%2FeT48Hyidd1A%3D%3D ; Jul 12, 2022 ; 5 Pages.
Geodaq, Inc. ; PRO-5 Displacement-Strain Profile Measurement System for Structural Health Monitoring ; Aug. 2019 ; 2 Pages.

* cited by examiner

RESPONSE CONTROL OF BEAM VIBRATIONS WITH A RECIPROCATING DYNAMIC DAMPER

BACKGROUND

Technical Field

The present disclosure is directed to methods and systems to control the response of a dynamic system using a reciprocating dynamic damper.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Movement of a load, such as a vehicle, over a structure, such as a beam or a bridge, may generate a momentary force on the structure. The momentary force may elicit a dynamic response from the structure, such as vibration, which can weaken or damage the structure. Any equipment installed or located within the structure might experience an unexpected result due to the vibrations, thereby adversely impacting the performance of the equipment.

There are several references which describe the adverse impact of the moving forces on a structure and ways to reduce the impact. In one reference, a theoretical analysis of the dynamic response of a viscoelastically supported beam with a spring damper and a lumped mass at each end is discussed. The beam was crossed by a moving mass. The viscoelastically supported beam had a spring damper consisting of a linear spring in parallel with a dashpot damper and a rotational spring and mass at either end. A moving mass progressed along the beam. Calculations were performed to determine the effect of the moving mass on the damper response. The mass spring damper was adjusted when the moving load approached the end. (See: Hirzinger et al. "Dynamic response of a non-classically damped beam with general boundary conditions subjected to a moving mass-spring-damper system", International Journal of Mechanical Sciences Volume 185, (2020), 105877, incorporated herein by reference in its entirety). This reference does not mention about using a dynamic linear spring mass damper to counteract the vibrations.

Accordingly, it is one object of the present disclosure to provide methods and systems for response control of a dynamic system by a reciprocating dynamic damper.

SUMMARY

In an exemplary embodiment, a dynamic damper is disclosed. The dynamic damper system includes a beam having a first fixed end, a second fixed end, a width and a thickness, The dynamic damper system further includes a first flexible support connected to the beam beneath the first end, wherein the first flexible support has a linear spring constant, $k_l$, and a second flexible support connected to the beam beneath the first end and the second end, wherein the second flexible support has the linear spring constant, $k_l$. Each of the first flexible support and the second flexible support has the linear spring constant, $k_l$. The dynamic damper system further includes a first torsional spring and a second torsional spring connected to the first end and to the second end, respectively. Each of the first torsional spring and the second torsional spring has a torsional spring constant, $k_\theta$. The dynamic damper system further includes a moving load configured to traverse the beam reciprocally from the first end to the second end. The moving load generates first vibrations in the beam. The dynamic damper system further includes a dynamic linear spring mass damper connected to the beam. The dynamic linear spring mass damper is configured to travel reciprocally between the first end and the second end. The travel of the dynamic linear spring mass damper is configured to generate second vibrations in the beam which are 180 degrees out of phase with the first vibrations.

In another exemplary embodiment, a method for employing a technique to control the response of a dynamic system using a reciprocating dynamic damper is disclosed. The method includes connecting a first flexible support having a linear spring constant, $k_l$, beneath a first fixed end of the beam. The method further includes connecting a second flexible support having a linear spring constant, $k_l$, beneath a second fixed end of the beam. The method further includes connecting a first torsional spring having a torsional spring constant, $k_\theta$ to the first end. The method further includes connecting a second torsional spring having the torsional spring constant, $k_\theta$ to the second end. The method further includes connecting a dynamic linear spring mass damper housing to the beam. The method further includes generating, with a moving load, first vibrations in the beam. The method further includes actuating, with a motor, the dynamic linear spring mass damper to travel reciprocally between the first end and the second end, thereby generating second vibrations in the beam which are 180 degrees out of phase with the first vibrations.

In another exemplary embodiment, a non-transitory computer readable medium having instructions stored therein that, when executed by one or more processors, cause the one or more processors to perform a method of damping vibrations in a beam traversed by a moving load. The method includes receiving first vibration signals generated by a first accelerometer connected to the beam and connecting a dynamic linear spring mass damper to the beam. The method further includes receiving second vibration signals generated by a second accelerometer of a dynamic linear spring mass damper connected to the beam. The method further includes receiving position signals from a position sensor connected to a housing of the dynamic linear spring mass damper. The method further includes Fourier transforming the first vibration signals, the second vibration signals and the position signals to a frequency space. The method further includes calculating a force, F(x, t) of the moving load on the beam based on a weighted sum of a fourth partial derivative with respect to position of a frequency of the moving load, a first partial derivative with respect to position of the frequency of the moving load, a second partial derivative with respect to time of the frequency of the moving load, a displacement of a mass of the dynamic linear spring mass damper due to the second vibrations multiplied by a Fourier transform of a second force, G(x, t), on the beam generated by the second vibrations of the dynamic linear spring mass damper, and a first derivative of the displacement of the mass due to the second vibrations multiplied by the second force on the beam generated by the second vibrations of the dynamic linear spring mass damper. The method further includes calculating the speed and travel distance of the dynamic linear spring mass damper needed to dampen the vibrations based on the force, F(x, t).

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
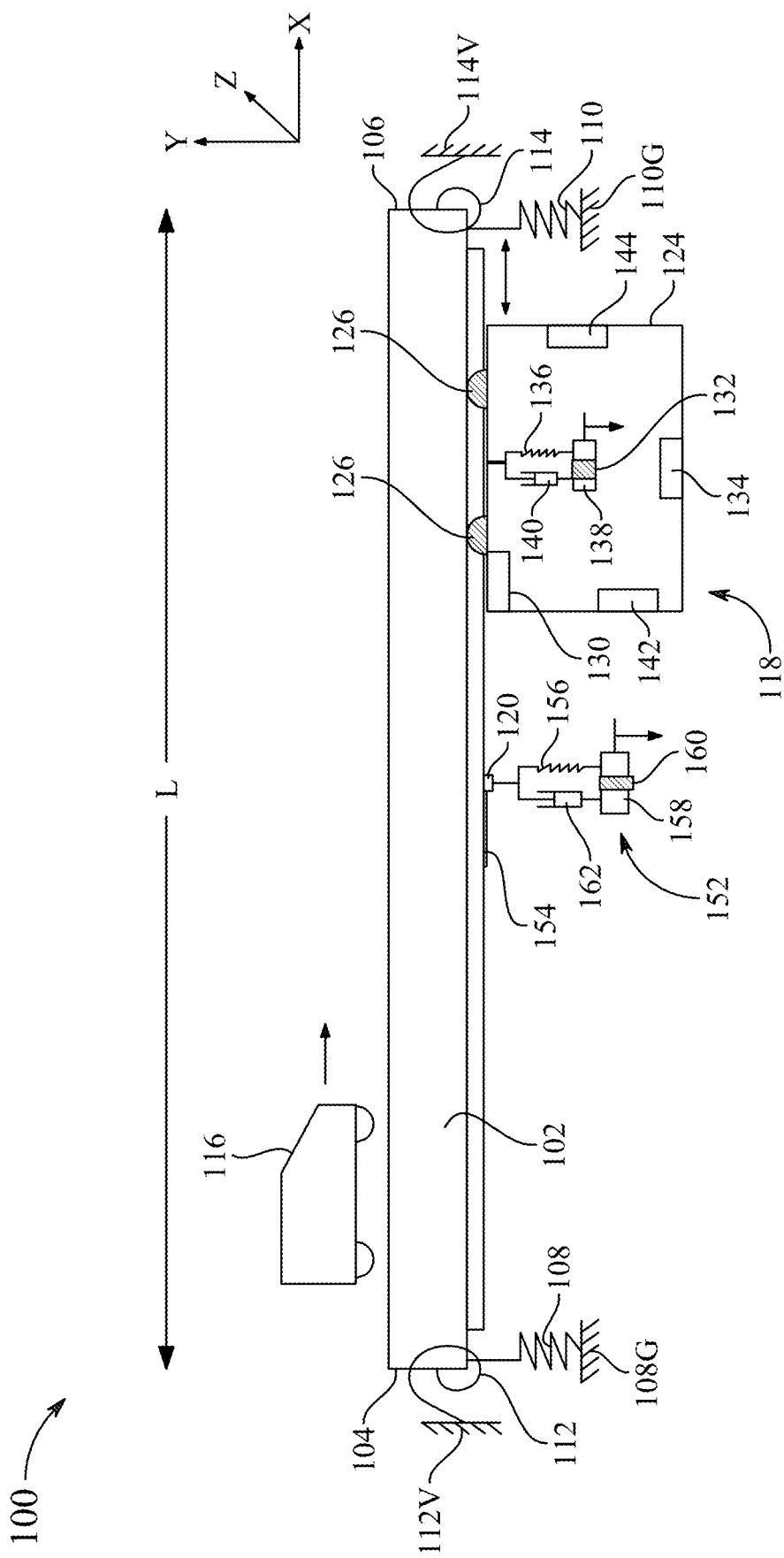
FIG. 1A illustrates a schematic diagram of a dynamic damper system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system, device, and method for controlling a response of a dynamic system by using a reciprocating dynamic linear spring mass damper. Dynamic responses of a beam due to a moving load, for example, a vehicle, reciprocating continuously (back and forth) along a full length or a partial length of a beam during multiple cycles, which generate vibrations in the beam, are analyzed. The vibration generated is controlled or dampened by setting a dynamic linear spring mass damper in motion at a calculated speed or by traversing the dynamic linear spring mass damper for a calculated travel length coupled with the calculated speed. The dynamic linear spring mass damper is moved along with the moving load having a synchronized or unsynchronized motion over the beam. The dynamic linear spring mass damper moving with the calculated speed generates a second set of vibrations in the beam which are 180 degrees out of phase with the vibrations in the beam generated by the moving load, thereby dampening the vibrations in the structure.

FIG. 1A illustrates a schematic diagram of a dynamic damper system 100, according to an aspect of the present disclosure. The dynamic damper system 100 includes a beam 102. The beam 102 refers to a structure such as a continuous beam, supported beam, fixed beam, overhanging beam, cantilever beam, and such structures. In some examples, the beam 102 may refer to a bridge structure such as a railway bridge, a highway overpass, a highway bridge, or even a footbridge. The beam 102 has a first end 104, and a second end 106 opposite to the first end 104. The beam 102 may be composed of any of concrete, reinforced concrete, rubberized cement, metals and/or non-metals, and combinations thereof.

The dynamic damper system 100 includes a flexible support connected at both ends of the beam 102 for supporting the structure of the beam 102. A first flexible support 108 is connected to the beam 102 beneath the first end 104. The first flexible support 108 refers to a spring connected beneath the first end 104 of the beam 102. One end of the first flexible support 108 is connected to the first end 104 of the beam 102, and other end of the first flexible support 108 is rigidly fixed over a first ground support 108G. The first flexible support 108 has a linear spring constant, $k_l$. Similarly, a second flexible support 110, such as another spring having the same linear spring constant, $k_l$ is connected to the beam 102 beneath the second end 106. One end of the second flexible support 110 is connected to the second end 106 of the beam 102, while the other end of the second flexible support 110 is rigidly fixed over a second ground support 110G.

The dynamic damper system 100 includes a torsional spring connected at both ends of the beam 102. A first torsional spring 112 is rigidly connected or fixed to the first end 104 of the beam 102. One end of the first torsional spring 112 is connected to the first end 104 of the beam 102, and another end of the first torsional spring 112 is rigidly fixed to a first vertical support 112V. The other end of the first torsional spring 112 is also be connected or rigidly fixed to the first ground support 108G. The dynamic damper system 100 includes a second torsional spring 114 rigidly connected to the second end 106 of the beam 102. One end of the second torsional spring 114 is connected to the second end 106 of the beam 102, and another end of the second torsional spring 114 is rigidly fixed to a second vertical support 114V. The other end of the second torsional spring 114 is also be connected or rigidly fixed to a second ground support 110G. The first torsional spring 112 as well as the second torsional spring 114 have a torsional spring constant value $k_\theta$.

The dynamic damper system 100 also compensates for the vibrations generated by a moving load 116 which traverses the beam 102. The moving load 116 may refer to any moving object such as an automobile, a vehicle, a train, a pedestrian, an animal, a bus, a truck, and the like, over the beam 102. The moving load 116 may have an unknown mass. The moving load 116 may generate first vibrations in the beam 102 as it travels across the length of the beam 102. The strength of the first vibrations may be a result of a force of the moving load 116, a weight of the moving load 116, a location and a speed of the moving load 116 over the beam 102. The strength of the first vibrations may also depend on a width, thickness, weight and density of the beam 102. The location of the moving load 116 may be calculated. The moving load 116 is configured to traverse the beam 102 reciprocally from the first end 104 to the second end 106 or from the second end 106 to the first end 104. In an example, the moving load 116 may be a vehicle which travels the length of the beam 102. A similar moving load travelling in an opposite direction of the moving load 116 generates the reciprocal movement. The moving load 116 may initially be located at any location over the beam 102 and may start traversing the beam 102 either towards the first end 104 or the second end 106. Accordingly, movement of the moving load 116 while traversing the beam 102 reciprocally from the first end 104 to the second end 106 generates first vibrations in the beam 102.

To measure the first vibrations, the dynamic damper system 100 includes a first accelerometer 120. An accelerometer is a sensor that measures the dynamic acceleration of a physical device as a voltage. The first accelerometer 120 is connected to the beam 102. A mounting plate 154 made up of, for example, metal, plastic, steel, aluminum, copper and such elements, may be attached at the bottom side of the beam 102 using, for example, a nut-bolt or a screw arrangement. The first accelerometer 120 is coupled to the mounting plate 154 at a bottom side of the beam 102. The first accelerometer 120 measures the first vibrations generated by the movement of the moving load 116 across the beam 102. Using the measured first vibrations, the first accelerometer 120 generates first vibration signals, which can be received by a dynamic linear spring mass damper 118 and used by a microcontroller 144 to adjust a motor 130 in the dynamic linear spring mass damper 118 and control its speed and travel distance. In a non-limiting example, the first accelerometer 120 may be a ceramic piezoelectric sensor or accelerometer. In a non-limiting example, the first accelerometer 120 may be a Pro5 Displacement-Strain Profile measurement system equipped with a 3-axis accelerometer, a strain gauge and a temperature sensor. (See: GEODAQ Automated Monitoring Systems, 2019, 4750 J Street #191552, Sacramento, California, United States). The first accelerometer 120 may be connected by an electrical cable (not shown) to the microcontroller 144 or may generate wireless signals which are received by the microcontroller 144. The first accelerometer 144 may also be used to receive a fundamental vibration of the beam 102 during installation to measure a fundamental vibration of the unloaded beam. The measurement of the fundamental vibration may be used to determine the spring constant of spring 156 and the weight of the mass 158.

To dampen the first vibrations in the beam 102, the dynamic damper system 100 includes a dynamic linear spring mass damper 118 movably coupled to the bottom side of the beam 102. In an aspect, the dynamic linear spring mass damper 118 is configured to produce vibrations that dampen or substantially dampen the first vibrations in the beam 102 caused due to the movement of the moving load 116. The dynamic linear spring mass damper 118 is configured to move reciprocally between the first end 104 and the second end 106, for example, on a track using wheels 126. The wheels 126 are actuated by a motor 130. The dynamic linear spring mass damper 118 includes a second accelerometer 132, a position sensor 134, a spring 136, a mass 138, a dashpot 140, a battery 142 and a microcontroller 144. In a non-limiting example, the model and specification of the second accelerometer 132 may be substantially identical to that of the first accelerometer 120. In examples, the second accelerometer 132, the position sensor 134, the spring 136, the mass 138, the dashpot 140, the battery 142 and the microcontroller 144 are encased in a dynamic linear spring mass damper housing 124 (hereinafter referred to as the housing 124). The microcontroller 144 includes a processing unit that uses the first vibration signals to adjust a motor 130 in the dynamic linear spring mass damper 118 and control its speed and travel distance. In a non-limiting example, the microcontroller 144 may be an Advanced RISC Machine (ARM) (See: Arm limited, 120 Rose Orchard Way, San Jose, United States) or MSP based microcontroller (See: Texas Instruments, Inc. Box 660199 12500 TI Blvd. Dallas, Texas, United States).

The second accelerometer 132 measures second vibrations generated by the movement of the dynamic linear spring mass damper 118. For example, during the movement of the housing 124, the dynamic linear spring mass damper 118 generates the second vibrations within the housing 124. The second accelerometer 132 generates a second vibration signal corresponding to the second vibrations. In one example, the second accelerometer 132 may be attached to the upper interior surface of the housing 124. In another example, the second accelerometer 132 may be attached to walls of one of the inner surfaces of the housing 124 or on the floor of the housing 124.

The position sensor 134 is configured to identify the location or position of the dynamic linear spring mass damper 118 underneath the beam 102. In an aspect, the position sensor 134 may indicate an absolute position of the dynamic linear spring mass damper 118 or a relative position or displacement of the dynamic linear spring mass damper 118 in terms of linear travel with respect to the first end 104 or the second end 106. The position sensor 134 is configured to measure a distance of the housing 124 from the first end 104 or the second end 106 or both at the same time. Based upon the position of the dynamic linear spring mass damper 118, the position sensor 134 is configured to generate a position signal. In some examples, the position signal may provide a coordinate indicating a distance from the first end 104 and/or a coordinate indicating a distance of the housing 124 from the second end 106. In an aspect, the position signal may also indicate a linear displacement of the housing 124 with respect to the first end 104 or the second end 106 or both. The position sensor may include an antenna (not shown) or a laser aperture (not shown) located on an exterior of the housing 124. A time of flight measurement from the position of the dynamic linear spring mass damper housing to the first end or the second end may be used to determine the position. Alternatively, the position sensor may include a global position system (GPS) connected to the antenna which determines position coordinates of the housing 124. The position sensor 134 is not limited to a laser position sensor or to a GPS unit and may be any type of positioning sensor known in the art. For example, the position sensor 134 may receive the first vibration signals from the first accelerometer 120 and use the first vibration signals to determine the position of the housing 124.

The spring 136 is used for providing dynamic structural support to the dashpot 140. The spring 136 may have a spring constant $k_d$, and is connected to inner ceiling or an upper interior surface of the housing 124 underneath the upper exterior surface 124U. For example, a first end of the spring 136 is connected to the upper interior surface of the housing 124. A second end of the spring 136 is connected to a mass 138. The mass 138 refers to a solid object of a defined value. The mass 138 is connected to the second accelerometer 132. The mass 138 is connected to the dashpot 140. The dashpot 140 is a device which damps the first vibrations. The dashpot 140 has a coefficient of stiffness value $c_d$. A first end of the dashpot 140 is connected to the upper interior surface of the housing 124. A second end of the dashpot 140 is connected to the mass 138. In some examples, the dashpot 140 is connected in parallel to the spring 136.

The battery 142 supplies power to run the motor 130, the second accelerometer 132 and the microcontroller 144 at a defined voltage and current level. In one aspect, if the microcontroller is connected by an electrical cable to the first accelerometer 120, the battery 142 may supply power to the first accelerometer 120. Preferably, the microcontroller is wirelessly connected to the first accelerometer 120, which includes its own battery (not shown). The battery 142 in the housing 124 may be any of lithium-ion battery (Li-on), nickel-cadmium battery (Ni—Cd) battery, nickel-metal hydride battery and such batteries. The battery 142 may be a rechargeable battery. In an example, the battery 142 may be configured with an energy harvesting circuit which charges the battery using the first vibrations and/or the second vibrations. The energy harvesting circuit may be a piezoelectric energy harvesting transducer which is connected to the rechargeable battery. The piezoelectric energy harvesting transducer may be an EMSE-2 #TRPBF nanopower energy harvesting power supply manufactured by Analog Devices and available from Mouser Electronics, 1000 North Main Street, Mansfield, Texas, United States.

The microcontroller 144 is connected to the motor 130, the position sensor 134, the first accelerometer 120 and the second accelerometer 132. The microcontroller 144 may be wirelessly connected to the first accelerometer 120 or may be connected with an electrical cable (not shown) to the first accelerometer 120. The microcontroller 144 is configured to receive inputs from the first accelerometer 120, the second accelerometer 132 and the position sensor 134. For example, the microcontroller 144 receives the first vibration signal generated by the first accelerometer 120, the second vibration signal generated by the second accelerometer 132 and the current position of the dynamic linear spring mass damper 118 from the position sensor 134. The microcontroller 144 is configured to transform the first vibration signal, the second vibration signal and the position signal into a frequency domain or space using a Fourier transform.

Using the first vibration signal, the second vibration signal and the current position, the microcontroller 144 is configured to calculate a force, F(x, t) of the moving load 116 on the beam 102 based on a weighted sum of a fourth partial derivative with respect to a position of a frequency of the moving load 116, a first partial derivative with respect to a position of the frequency of the moving load 116, a second partial derivative with respect to time of the moving load 116, a displacement of the mass 138 due to the second vibrations multiplied by a Fourier transform of a second force, (G(x, t)), on the beam 102 generated by the second vibrations of the dynamic linear spring mass damper 118, and a first derivative of the displacement of the mass 138 due to the second vibrations multiplied by the second force on the beam 102 generated by the second vibrations of the dynamic linear spring mass damper 118. Considering E as an elastic modulus, I as $2^{nd}$ moment of the beam 102, w as a deflection or frequency in the x direction, L as a length of the beam 102, ρ is a density of the beam 102, b is a thickness of the beam 102 and h is width of the beam 102, the force F(x, t) is provided by:

$$F(x, t) = \rho b h \left( \frac{EI}{\rho b h} \frac{\partial^4 \hat{w}(x, t)}{\partial \hat{x}^4} + \frac{c_b}{\rho b h} \frac{\partial \hat{w}(x, t)}{\partial \hat{x}} + \frac{\partial^2 \hat{w}(x, t)}{\partial t^2} + \left( \frac{k_d}{\rho b h} \hat{u}(t) + \frac{c_d}{\rho b h} \frac{d\hat{u}(t)}{dt} \right) \hat{G}(x, t) \right);$$

where, ρ is the density of the beam 102, b is the width, h is the height of the cross section of the beam 102, x is the position on the beam 102, w(x, t) is the deflection of the beam 102 in the y direction at some position x and at time t, is the Fourier transform frequency of the deflection, $c_b$ is the stiffness of the beam 102, $c_d$ is the stiffness of the damper spring, u is the linear measure of the damper deflection, du/dt is the speed of the damper deflection, $k_d$ is the spring constant of the damper spring, G is the force (down or up) of the dynamic linear spring mass damper 118, and Ġ is the Fourier transform frequency of the damper vibrations. The caret over w(x,t), u(t) and G(x, t) indicates that these are dimensionless forms.

The microcontroller 144 calculates a speed and travel distance of the dynamic linear spring mass damper 118 required to dampen the vibrations based on the force, F(x, t) at each position from the first end 104 or the second end 106. Accordingly, the microcontroller 144 generates drive signals which actuate the motor 130 to rotate the wheels at a rotational speed such that the dynamic linear spring mass damper 118 moves at a velocity which may equal a speed of the moving load 116. The motor 130 rotates the wheels 126 based on the input obtained through the drive signals. In an example, the motor 130 may actuate the wheels 126 to rotate in a direction which moves the dynamic linear spring mass damper 118 in a same direction of travel as the moving load 116. In another example, the motor 130 may actuate the wheels 126 to rotate in a direction which moves the dynamic linear spring mass damper 118 in an opposite direction of travel as the moving load 116.

In an aspect of the present disclosure, the system 100 may include a fixed spring mass damper 152 configured to dampen the fundamental frequency of the beam 102. The fundamental frequency is the natural frequency of the beam when there is no moving load. Vibrations are generated through vibrations of the earth at the fixed ends and wind, which cause the beam to bend and sway. The fixed spring mass damper 152 is connected to the underside of the beam 102 at the mid location of the beam 102. For example, the fixed spring mass damper 152 is located at the distance L/2 from either the first end 104 or the second end 106. In an aspect, the fixed spring mass damper 152 is connected to the beam 102 at a mounting plate 154 using, for example, a nut-bolt or the screw mechanism. In an aspect, the mounting plate 154 is an integral part of the fixed spring mass damper 152. The fixed spring mass damper 152 includes a spring 156, $s_f$, having a spring constant $k_f$, connected to the mounting plate 154. For example, a first end of the spring 156 is connected to the mounting plate 154. The fixed spring mass damper 152 includes a mass 158, $m_f$. The mass 158 is connected to a second end of the spring 156. The mass 158 refers to a solid object of known mass value. The fixed spring mass damper 152 includes a dashpot 162, $d_f$, having a coefficient of stiffness value $c_f$. A first end of the dashpot 162 is connected to the mounting plate 154. A second end of the dashpot 140 is connected to the mass 158. The dashpot 162 is connected in parallel with the spring 156. The values of the mass 158, the spring constant of the spring 156 and the coefficient of stiffness of the dashpot 162 are chosen such that the fixed spring mass damper 152 is configured to generate a third vibration in the beam 102. A phase of the third vibration is 180 degrees out of phase with the phase of the vibrations accruing at the fundamental frequency of the beam 102. The fixed spring mass damper 152 includes an accelerometer 160. The accelerometer 160 is connected to the mass 158 using, for example, a nut-bolt or screw mechanism. During the motion of the moving load 116, the a plurality of vibrational may be generated in the beam 102. One of the frequencies may be a fundamental frequency of the vibrations and other frequencies may be generated by the moving load. The first accelerometer 120 attached to the mounting plate 154 is configured to measure the vibrations occurring at other frequencies as well as vibrations occurring at the fundamental frequency. The accelerometer 160 is configured to measure vibrations occurring at the fundamental frequency in the beam 102. The fixed spring mass damper 152 nullifies or dampens the vibrations occurring at the fundamental frequency of the beam 102 by generating the third vibrations in the beam 102 which are 180 out of phase with the vibrations of the fundamental frequency of the beam 102 and the other frequencies as measured at the mid-point of the beam.

Figure 1B:
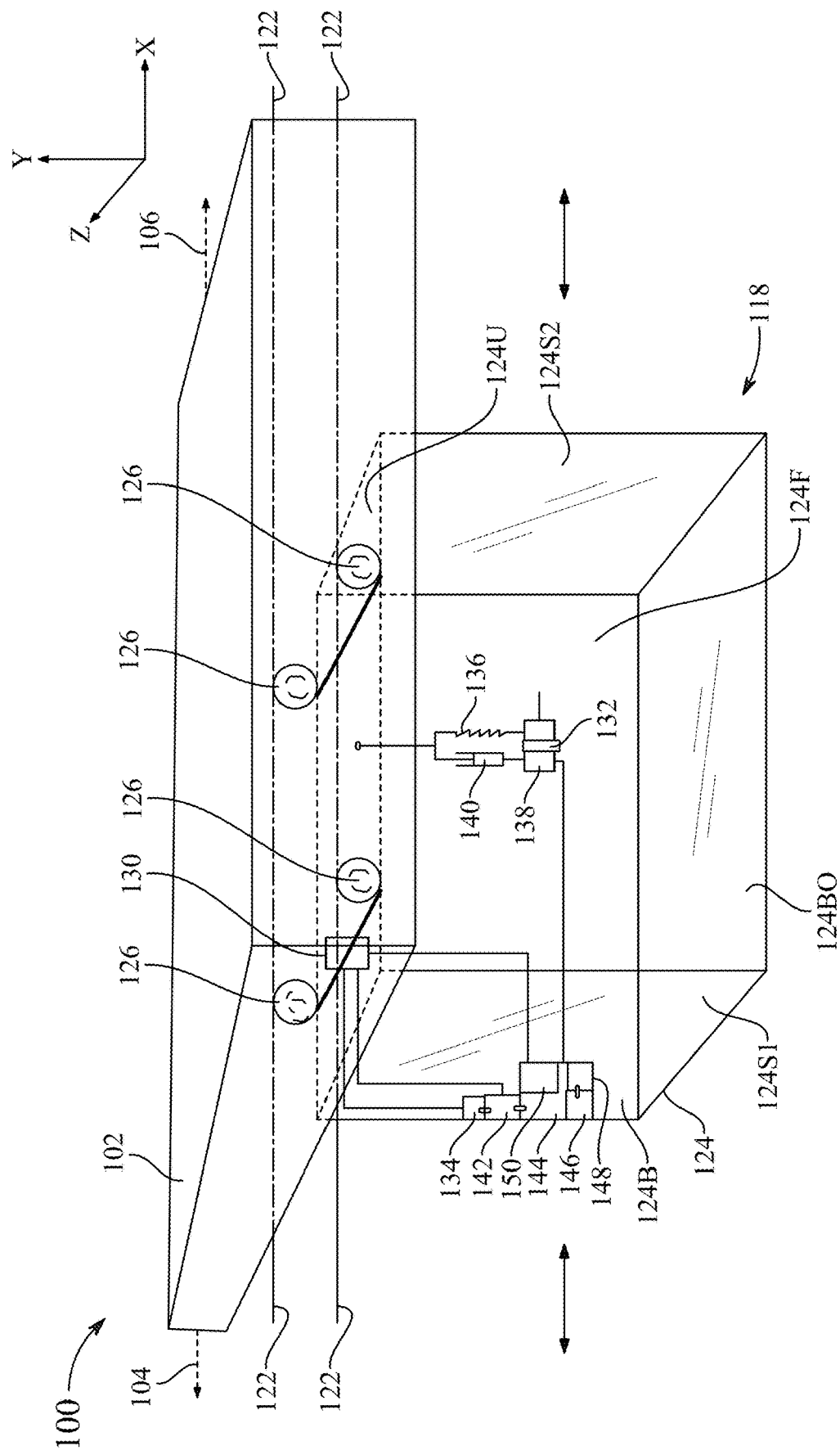
FIG. 1B illustrates a schematic diagram of a beam and a dynamic linear spring mass damper coupled to the beam, according to certain embodiments.

FIG. 1B illustrates a schematic diagram showing the beam 102 and the dynamic linear spring mass damper 118, according to an aspect of the present disclosure. To support a movement of the dynamic linear spring mass damper 118 below the beam 102, the dynamic damper system 100 includes the track 122 located on the underside of the beam 102. The track 122 is fastened to the underside of the beam 102 using, for example, a nut-bolt, a screw mechanism, or by welding, such that the track 122 engages with and remains fixed to the underside of the beam 102. In one example, the track 122 may be made from a material such as iron, copper, aluminum, or any metal structural material known in the art. In some examples, the track 122 may be made up of a non-metal or a polymer material such as a hard plastic, polyvinyl chloride (PVC) and such materials. The track 122 extends along the length L of the beam 102 from the first end 104 to the second end 106 underneath the beam 102. As shown, the dynamic damper system 100 includes the housing 124. The housing 124 encases the plurality of components of the dynamic linear spring mass damper 118. In an example, the housing 124 may be made up of a metal such as iron, aluminum, steel, or non-metals, or combination of metals and non-metals. In examples, the housing 124 may be made of the hard plastic material, such as PVC. In an example, the housing 124 has six exterior faces, that is, a bottom exterior surface 124BO, two side exterior surfaces 124S1 and 124S2, a front exterior surface 124F, a back exterior surface 124B and an upper exterior surface 124U. The components of the dynamic linear spring mass damper 118 are enclosed within the six interior faces of the housing 124.

The dynamic linear spring mass damper 118 includes a plurality of wheels 126. The plurality of wheels 126 are mounted to the upper exterior surface 124U using, for example, a nut-bolt mechanism. The plurality of wheels 126 are configured to engage with the track 122. The plurality of wheels 126 are connected to the motor 130 such that the wheel 126 may be actuated by a rotational force provided by the motor 130. In one aspect, the plurality of wheels 126 are connected to the motor 130 through, for example, a belt drive, gears or the like. Accordingly, the housing 124 can be configured to move towards the first end 104 or the second end 106 using the wheels 126 engaged with the track 122 underneath the beam 102 based upon drive signals generated by the microcontroller 144 which actuate the motor 130.

The microcontroller 144 includes a circuitry 146 including one or more processors and a memory 148. The memory 148 includes program instructions that, when executed by the one or more processors, converts the first vibration signals, the second vibration signals and the position signals into the frequency domain. Since the first vibration signals, the second vibration signals and the position signals are in the time domain, in order to determine the number of frequency components or harmonics and their location in frequency space, each of the first vibrations, the second vibrations and the position signals are transformed into the frequency space or domain. The first vibrations, the second vibrations and the position signals may be converted using any one of a plurality of transform techniques such as but not limited to a fast Fourier transform (FFT), a discrete Fourier transform (DFT) and a discrete-time Fourier transform (DTFT).

The memory 148 stores program instructions to compute the force F(x, t). Based upon the F(x, t), the microcontroller 144 is configured to calculate the speed and travel distance of the dynamic linear spring mass damper 118 needed to dampen the first vibrations caused due to the moving load 116. Accordingly, the microcontroller 144 is configured to generate drive signals that actuate the motor 130 to rotate each wheel 126 at a rotational speed on the track 122 based on the force F(x, t). In an aspect, the microcontroller 144 may actuate the motor 130 to rotate the wheels 126 to rotate at the rotational speed on the track 122 such that the dynamic linear spring mass damper 118 moves at a velocity equal to a speed of the moving load 116 to dampen the vibrations generated by the moving load 116 on the beam 102. In one aspect, the microcontroller 144 may actuate the motor 130 to rotate the wheels 126 at the rotational speed on the track 122 such that the dynamic linear spring mass damper 118 moves in the same direction as the moving load 116 to dampen the vibrations generated by the moving load 116 on the beam 102. In one aspect, the microcontroller 144 may actuate the motor 130 to rotate the wheels 126 at the rotational speed on the track 122 such that the dynamic linear spring mass damper 118 moves in the different direction of the moving load 116 to dampen the vibrations generated by the moving load 116 on the beam 102. The travel distance in a single direction of the dynamic linear spring mass damper 118 may be any part of the beam length. For example, the travel distance may be the full length of the beam, half of the beam, a quarter length of the beam, or any part of the beam length as needed to dampen the first vibrations generated in the beam by the moving load. The dynamic linear spring mass damper 118 may move, for example, a quarter length of the beam in the direction of the second end and then reciprocally move a quarter length of the beam towards the first end.

For example, based upon the force calculation F(x, t), the microcontroller 144 may compute and accordingly generate the drive signals to actuate the motor 130 to rotate the wheels 126 such that the dynamic linear spring mass damper 118 moves at least 10 meters towards the second end 106 at a speed of 30 km/h, when the dynamic linear spring mass damper 118 is initially at the first end 104, and the moving load 116 is also moving from the first end 104 to the second end 106. In another example, the microcontroller 144 may compute and accordingly generate the drive signals to actuate the motor 130 to rotate the wheels 126 such that the dynamic linear spring mass damper 118 moves at least 15 meters towards the first end 104 at a speed of 50 km/h when the dynamic linear spring mass damper 118 is initially at the second end 106 and the moving load 116 is travelling from the second end 106 to the first end 104. In another example, the microcontroller 144 may compute and accordingly generate drive signals to actuate the motor 130 to rotate the wheels 126 such that the dynamic linear spring mass damper 118 moves at least 30 meters towards the first end 104 at a speed of 50 km/h if the dynamic linear spring mass damper 118 is initially at the second end 106 and the moving load 116 is moving from the first end 104 to the second end 106. In another example, the microcontroller 144 may compute and accordingly actuate the wheels 126 such that the dynamic linear spring mass damper 118 moves at least 45 meters towards the second end 106 at a speed of 45 km/h if the dynamic linear spring mass damper 118 is initially at the first end 104 and the moving load 116 is travelling from the second end 106 to the first end 104. In another example, the microcontroller 144 may compute and accordingly generate drive signals to actuate the motor 130 to rotate the wheels 126 such that the dynamic linear spring mass damper 118 moves at the same velocity and the same direction as the moving load 116. In another example, the microcontroller 144 may compute and accordingly generate drive signals to actuate the motor 130 to rotate the wheels 126 such that the dynamic linear spring mass damper 118 moves at the same velocity, however in the opposite direction of the moving load 116. Accordingly, the dynamic linear spring mass damper 118 is configured to travel reciprocally between the first end 104 and the second end 106 over at least a portion of the beam length. The movement of the dynamic linear spring mass damper 118 generates second vibrations in the beam 102 which are 180 degrees out of phase with the first vibrations in the beam 102 generated by the moving load 116, thus dampening the first vibrations. In an aspect, the microcontroller 144 is configured to tune the second vibrations by adjusting the drive signals, thus modifying the speed and the travel distance of the dynamic linear spring mass damper 118.

Figure 1C:
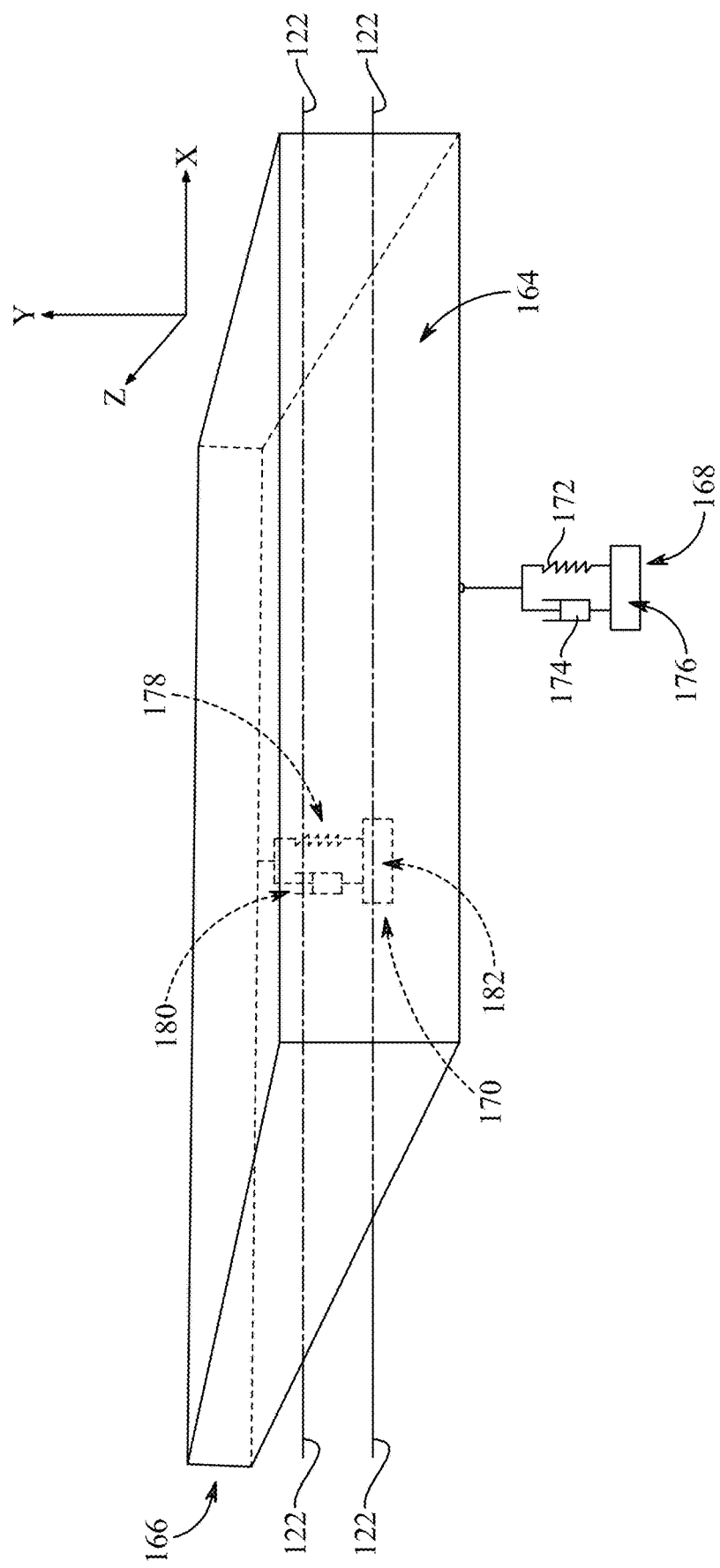
FIG. 1C illustrates an alternative arrangement of a fixed spring mass damper system in the dynamic damper system, according to certain embodiments.

FIG. 1C illustrates a fixed spring mass damper system in the dynamic damper system 100, according to an aspect. The dynamic damper system 100 may include two separate fixed spring mass damper systems instead of the fixed spring mass damper system 152 illustrated in FIG. 1A. The beam 102 may include a first side 164 and a second side 166 opposite to the first side 164. The first side 164 and the second side 166 refer to the extreme ends in the width direction of the beam 102, that is, in the Z-axis direction. The first side 164 may have a predetermined spacing with respect to the track 122 towards the first side 164. Similarly, the second side 166 may also have a substantially similar predetermined spacing with respect the track 122 towards the second side 166. A first fixed spring mass damper 168 is connected to the first side 164 underside of the beam 102 at the halfway between the first end 104 and the second end 106. Similarly, a second fixed spring mass damper 170 may be connected to the second side 166 and underside of the beam 102 at the halfway between the first end 104 and the second end 106. The first fixed spring mass damper 168 includes a spring 172, a dashpot 174 in parallel to the spring 172, and a mass 176 connected with the spring 172 and the dashpot 174. The first fixed spring mass damper 168 is configured to generate third vibrations. Similarly, the second fixed spring mass damper 170 may include a spring 178, a dashpot 180 in parallel to the spring 178, and a mass 182 connected with the spring 178 and the dashpot 180. The second fixed spring mass damper 170 is configured to generate fourth vibrations. In some examples, the spring constant of the spring 172 and the spring 178, stiffness coefficients of the dashpot 174 and the dashpot 180, and the mass 176 and the mass 182 are substantially identical. Accordingly, the third vibrations and the fourth vibrations may have a substantially equal amplitude and identical phases.

When the moving load 116 traverses the beam 102, the first fixed spring mass damper 168 and the second fixed spring mass damper 170 are configured to generate the third vibrations and the fourth vibrations, respectively, in the beam 102. Movement of the moving load 116 may generate other vibrations that add to the fundamental frequency at the midpoint of the beam 102. Accordingly, a summation of the third vibrations and the fourth vibrations generates combined vibrations having a frequency equal and opposite in amplitude and phase compared to the amplitude and phase of the vibrations of the fundamental frequency and the other vibrations generated by the moving load 116. Accordingly, the combined vibrations dampen the vibrations occurring at the fundamental frequency of the beam 102 and at least some of the other vibrations. This is illustrated with an example below.

The moving load 116 generates the other frequencies of vibration in the beam 102 of strength value X at a periodic phase of 90 degree. The first fixed spring mass damper 168 accordingly generates the third vibration of amplitude X/2 at −45 degree phase. Similarly, the second fixed spring mass damper 170 also generates the fourth vibration of amplitude X/2 at −45 degree phase. The two phases of the third vibration and the fourth vibration cause a combined vibration of −90 degree. Also, the amplitudes of the third vibration and fourth vibration cause a combined amplitude of X. Accordingly, the combination of the third vibration and the fourth vibration generates a vibration of amplitude X and phase −90 degree. Since the vibrations generated due to the combination of the third vibration and the fourth vibration are equal and opposite to the fundamental frequency of vibration and the other vibrations due to the moving load 116, the equal and opposition vibrations cancel the other vibrations due to the moving load 116 and dampen the vibration at the fundamental frequency of the beam 102.

In operation, when the moving load 116 moves over the beam 102 having the dynamic linear spring mass damper 118, the microcontroller 144 is configured to calculate the force F(x, t) over the beam 102 due to the moving load 116. The force F(x, t) of the moving load 116 on the beam 102 is based on plurality of factors such as weighted sum of the fourth partial derivative with respect to position of a frequency of the moving load 116, the first partial derivative with respect to position of the frequency of the moving load 116, the second partial derivative with respect to time of the moving load 116, the displacement of the mass 176 and the mass 182 due to the third vibrations and the fourth vibrations multiplied by a Fourier transform of a second force (G(x, t)) on the beam 102 generated by the third vibrations and the fourth vibrations of the first fixed spring mass damper 168 and the second fixed spring mass damper 170, and a first derivative of the displacement of the mass 176 and the mass 182 due to the third vibrations and the fourth vibrations multiplied by a Fourier transform of a second force multiplied by the second force (G(x, t)) on the beam 102 generated by the second vibrations of the dynamic linear spring mass damper 118.

In some examples, apart from the first fixed spring mass damper 168 and the second fixed spring mass damper 170, the dynamic damper system 100 may also include the fixed spring mass damper 152 to dampen the first vibrations. The combined vibrations of the dynamic damper system 100 due to the fixed spring mass damper 152, the first fixed spring mass damper 168, and the second fixed spring mass damper 170 dampen the first vibrations. In some examples, the first fixed spring mass damper 168 and the second fixed spring mass damper 170 may be combined with the dynamic linear spring mass damper 118 to dampen the first vibrations. The combined vibrations of the first fixed spring mass damper 168, the second fixed spring mass damper 170 and the dynamic linear spring mass damper 118 dampen the first vibrations.

Figure 2A:
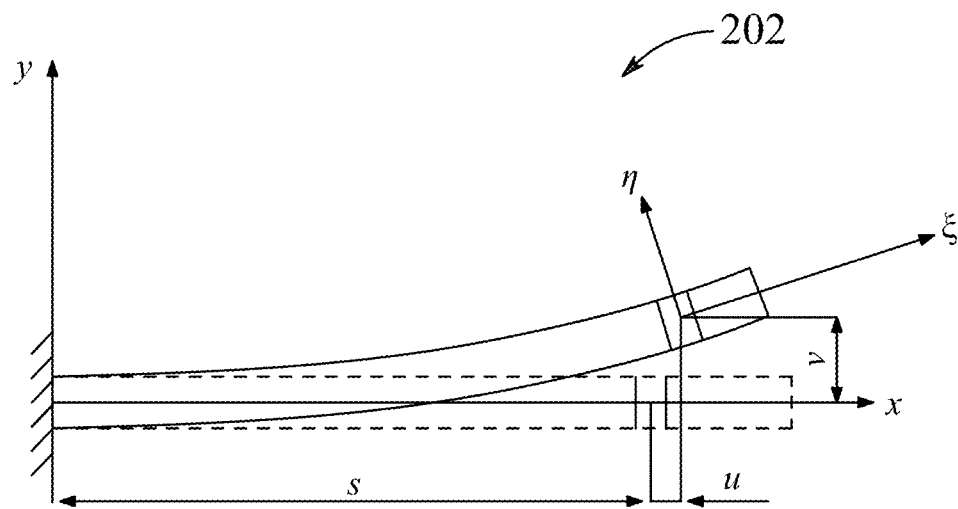
FIG. 2A illustrates an Euler-Bernoulli beam section and a dynamic response of the Euler-Bernoulli beam section to a moving load, according to certain embodiments.

FIG. 2A illustrates an Euler-Bernoulli beam section and its dynamic response in response to a moving load. The Euler-Bernoulli beam refers to a beam that follows a Euler-Bernoulli beam theory. The Euler-Bernoulli beam theory is a simplification of the linear theory of elasticity which provides a means of calculating the load-carrying and deflection characteristics of beams. The beam (for example, the beam 102) may be considered as an Euler-Bernoulli beam 202 as an example as its analysis is simple as compared to other beam calculations known. Moving harmonic loads instead of a constant load can represent, for instance, a component of the load transmitted to rails structure by moving trains, the load applied by vehicles resulting from the rough surface of pavements and mechanical vehicle systems, or the load exerted on a footbridge by a walking pedestrian. The Euler-Bernoulli beam 202 is a convenient technique for the analysis of moving loads under many variable conditions. The Euler-Bernoulli beam 202 is useful in computing the force equations, boundary conditions and finding new methods for controlling and suppressing the vibration responses due to the moving load. In order to describe the characteristics of a section of the beam 202 and the influence of the moving load or force on the dynamic response of the beam, the Euler-Bernoulli beam 202 is shown in FIG. 2A. The Euler-Bernoulli beam 202 provides 2 degrees of freedom at the beam section level, and 4 degrees of freedom at a nodal element level. A constitutive law is applicable for 4×4 matrix of Euler-Bernoulli beam 202 in solving for the aforementioned degree of freedoms.

Figure 2B:
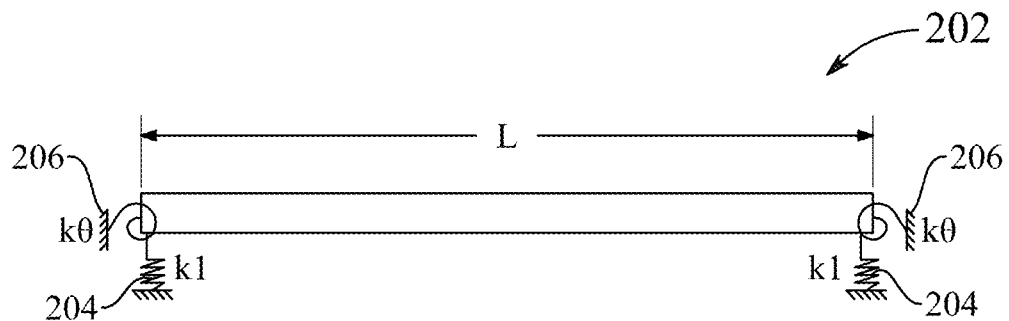
FIG. 2B illustrates a mathematical model of the Euler-Bernoulli beam when no damper system is attached to the Euler-Bernoulli beam, according to certain embodiments.

FIG. 2B illustrates a mathematical model of the Euler-Bernoulli beam when no damper system is attached to the beam. The Euler-Bernoulli beam 202 has dimensional length "L" and specific mass "m". The Euler-Bernoulli beam 202 includes a linear spring 204 and torsional spring 206 as flexible supports. To compute a maximum deflection at different percentages of critical velocities, a Glarekin and Runge-Kutta method is used. The Glarekin and Runge-Kutta method is a technique used to convert a continuous operator problem, such as a differential equations, to a discrete problem by applying linear constraints and solving the discrete problem (of initial-value) of the differential equation. Dimensional boundary conditions of Euler-Bernoulli beam 202 with linear springs having stiffness $k_l$ and torsional spring with stiffness $k_\theta$ are provided as a mathematical formula below.

$$EI \frac{\partial^3 \hat{w}(0, t)}{\partial \hat{x}^3} = k_l \hat{w}(0, t). \quad (1)$$

When the Euler-Bernoulli beam 202 includes no damper system, the mathematical model is provided as:

$$\frac{EI}{\rho bh} \frac{\partial^4 \hat{w}(x, t)}{\partial \hat{x}^4} + \frac{c_b}{\rho bh} \frac{\partial \hat{w}(x, t)}{\partial \hat{x}} + \frac{\partial^2 \hat{w}(x, t)}{\partial \hat{t}^2} = \frac{\hat{F}(x, t)}{\rho bh}. \quad (2)$$

Dividing Equation (2) by ρbh Equation (3) is obtained.

$$\frac{EI}{\rho bh}\frac{\partial^4 \hat{w}(x,t)}{\partial \hat{x}^4} + \frac{c_b}{\rho bh}\frac{\partial \hat{w}(x,t)}{\partial \hat{x}} + \frac{\partial^2 \hat{w}(x,t)}{\partial \hat{t}^2} = \frac{\hat{F}(x,t)}{\rho bh}. \quad (3)$$

Figure 2C:
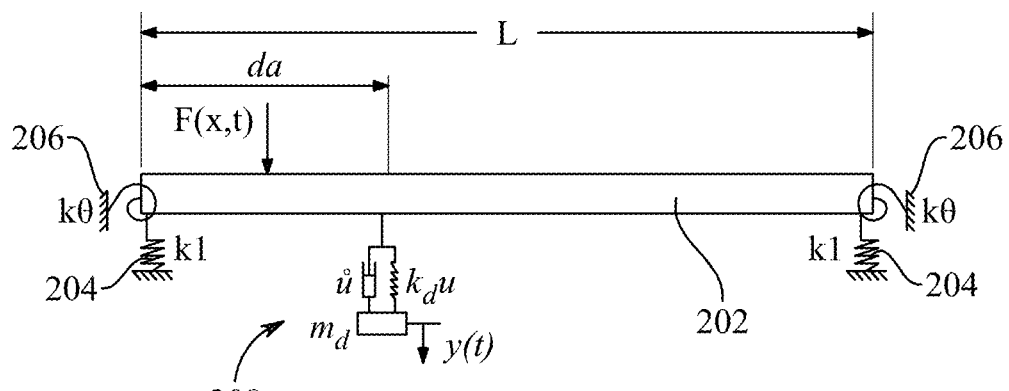
FIG. 2C illustrates a mathematical model of the Euler-Bernoulli beam when a fixed spring mass damper system is attached to the Euler-Bernoulli beam, according to certain embodiments.

FIG. 2C illustrates a mathematical model of the Euler-Bernoulli beam 202 when a fixed spring mass damper system is attached to the Euler-Bernoulli beam 202. A linear spring-mass damper 208 is incorporated in the beam model. The Euler-Bernoulli beam 202 is subject to the force F(x, t) generated by the moving load. With presence of the linear spring 204, a force G (x, t) is added in the model. Mathematically, the force equation is provided by:

$$EI\frac{\partial^4 \hat{w}(x,t)}{\partial \hat{t}^4} + c_b\frac{\partial \hat{w}(x,t)}{\partial t} + \rho bh\frac{\partial^2 \hat{w}(x,t)}{\partial \hat{t}^2} + \left(k_d \hat{u}(t) + c_d \frac{\partial \hat{u}(t)}{\partial \hat{t}}\right)\hat{G}(x,t) = \hat{F}(x,t). \quad (4)$$

An equation describing the spring mass damper movement (Dimensional Form), is shown in equation (5):

$$m_d \frac{d^2 \hat{y}(r)}{d\hat{t}^2} - c_d \frac{\partial \hat{u}(d,t)}{\partial \hat{t}} - k_d \hat{u}(d,t) = 0, \quad (5)$$

where $m_d$ is a mass of the spring mass damper movement.

Dividing the Equation (5) with ρbh yields equation (6) as provided below:

$$\frac{EI}{\rho bh}\frac{\partial^4 \hat{w}(x,t)}{\partial \hat{x}^4} + \frac{c_b}{\rho bh}\frac{\partial \hat{w}(x,t)}{\partial \hat{x}} + \frac{\partial^2 \hat{w}(x,t)}{\partial \hat{t}^2} + \left(\left(\frac{k_d}{\rho bh}\hat{u}(t) + \frac{c_d}{\rho bh}\frac{d\hat{u}(t)}{dt}\right)\hat{G}(x,t) = \frac{F(x,t)}{\rho bh}. \quad (6)$$

FIG. 3A-FIG. 3D illustrate plots of a modal shapes for beam systems having flexible boundary conditions and generating non-classical beam natural frequencies. Eigenvalues and modal shapes are compared to results known in the art. The beam parameters for the boundary conditions are provided in Table 1 as below:

TABLE 1

| Beam flexural rigidity and spring stiffness | |
|---|---|
| Parameters | Values |
| Flexural Rigidity of Beam (EI) | 8000 N·m² |
| Spring Stiffness ($k_s$) | 1000 N/m |

Figure 3A:
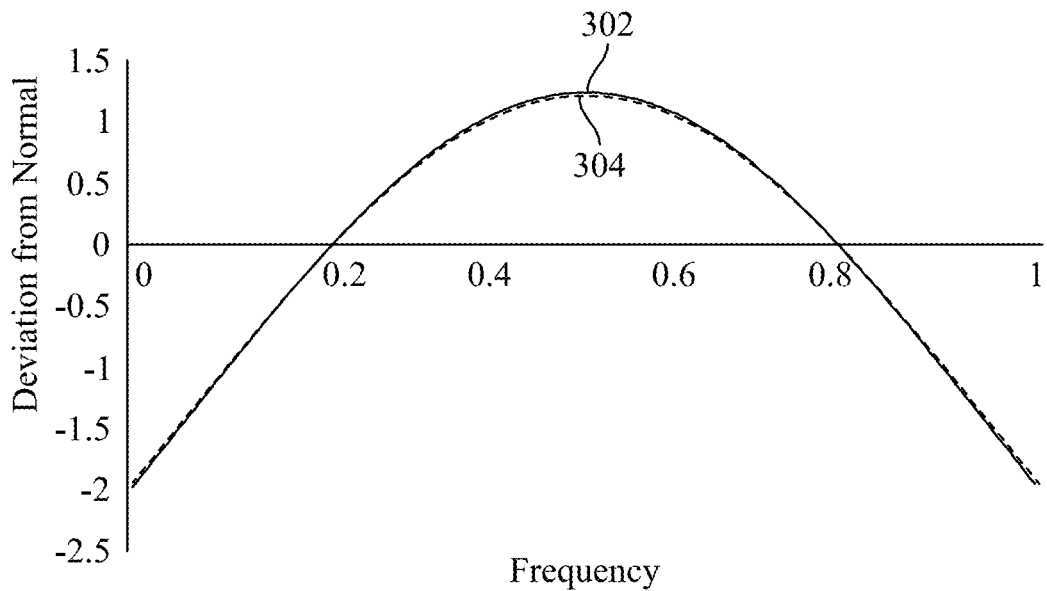
FIG. 3A illustrates a plot showing a first modal expansion shape compared with a modal shape for a beam having boundary conditions of linear spring, according to certain embodiments.
Figure 3B:
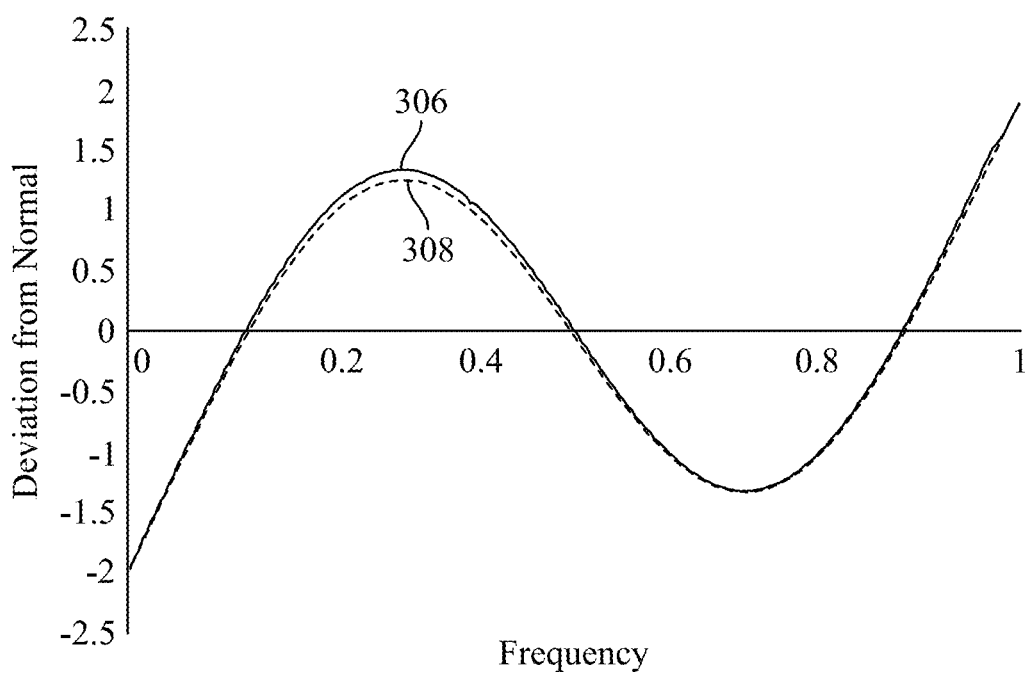
FIG. 3B illustrates a plot showing a second modal expansion shape compared with a modal shape for a beam having boundary conditions of linear spring, according to certain embodiments.
Figure 3C:
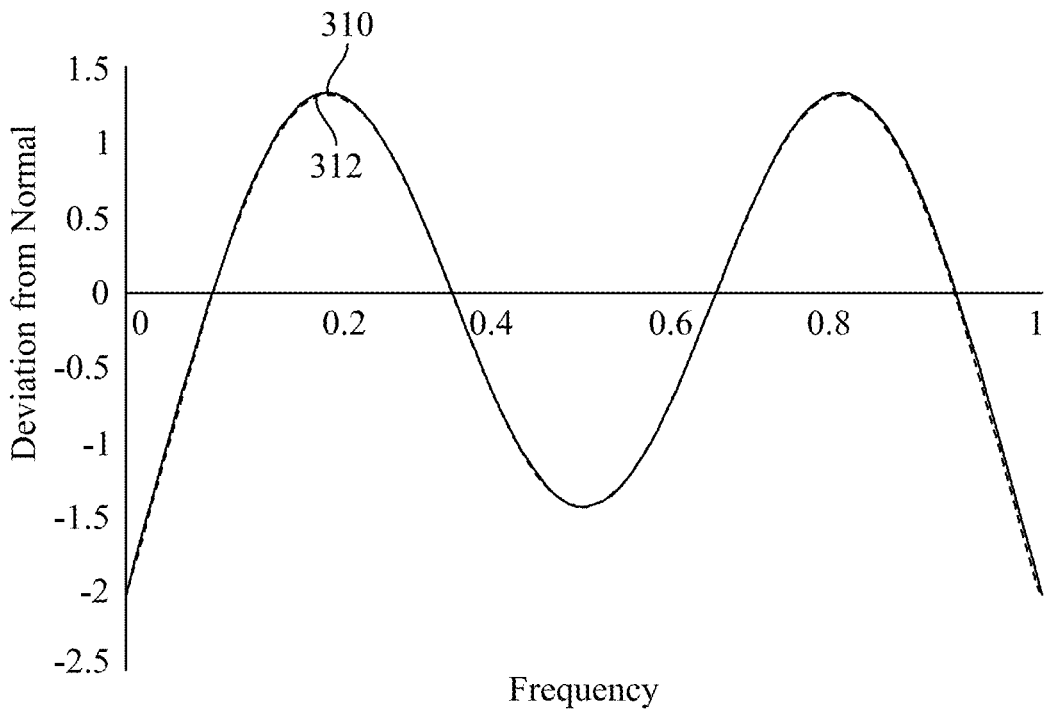
FIG. 3C illustrates a plot showing a third modal expansion shape compared with a modal shape for a beam having boundary conditions of linear spring, according to certain embodiments.
Figure 3D:
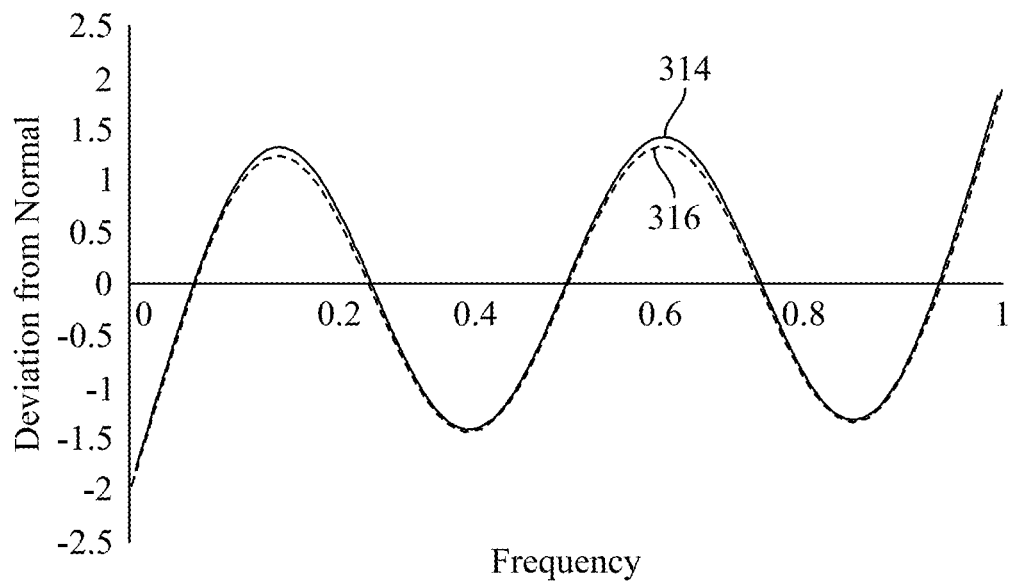
FIG. 3D illustrates a plot showing a fourth modal expansion shape compared with a modal shape for a beam having boundary conditions of linear spring, according to certain embodiments.

A dashed curve 304 represents a first modal shape, whereas a solid curve 302 illustrates the results of an experimental study of the modal shape for the beam 202 of the present disclosure. A solid curve 306 illustrates a second mode expansion, whereas a dashed curve 308 illustrates an experimental study of the model shape for the beam 202, as illustrated in FIG. 3B. Solid curve 310 represents a third modal shape, whereas a dashed curve 312 illustrates an experimental study of the model shape for the beam 202 performed for the disclosure, as illustrated in FIG. 3C. A solid curve 314 illustrates a fourth mode expansion, whereas a dashed curve 316 illustrates the experimental study of the model shape for the beam 202 performed for the disclosure, as illustrated in FIG. 3D. Considering each of the plots in FIG. 3A-FIG. 3D, the modal shapes and eigenvalues are in perfect agreement with the modal shapes plots known in the art for beam 202 having boundary conditions of linear spring or non-classical beam.

Figure 4A:
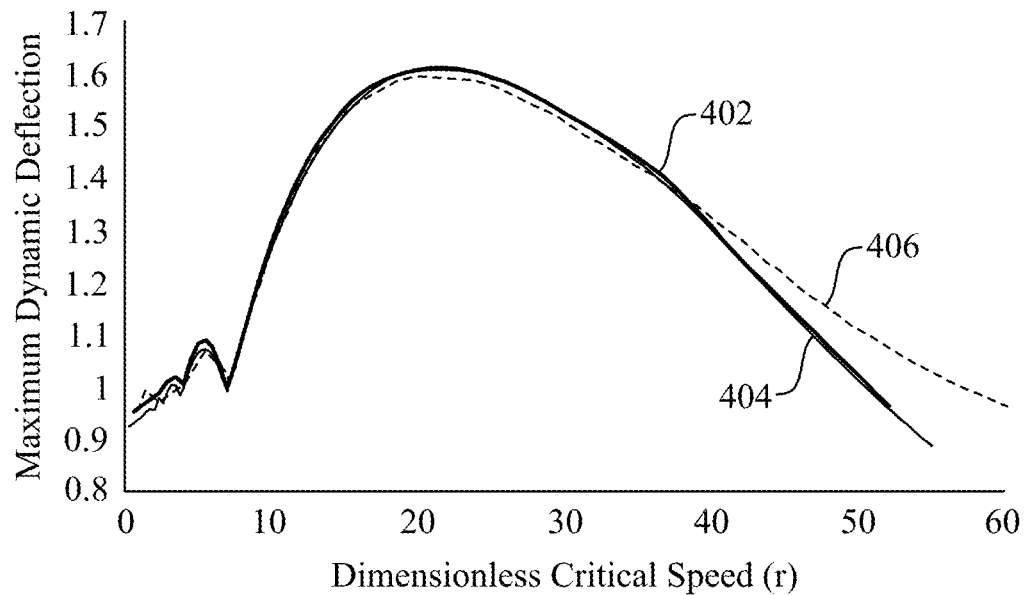
FIG. 4A illustrates a maximum dynamic deflection of non-classical supported beam at mid-span as a function of dimensionless critical speed (r) for single cycle-n when no fixed damper is attached, according to certain embodiments.

FIG. 4A illustrates a dynamic deflection of non-classical supported beam at mid-span as a function of dimensionless speed (r) for single cycle-n when no fixed damper is attached. Initially the beam 102 is coupled with the linear dynamic damper at a fixed position and traversed by a moving load. To check the validity, the stiffness of linear springs is used as a boundary condition. The stiffness is further increased such that the beam generates mode shapes of simply supported beam with fixed damper. Non-classical and classical sinusoidal model were employed and three cases with specified parameters were studied to perform analysis.

The beam parameters taken used in the validation are shown in Table 2 as below.

TABLE 2

| Reference parameters of Simply Supported Beam | | | | |
|---|---|---|---|---|
| E | ρ | L | h | b |
| 206.8 GPa | 3 7820 Kg/m³ | 4 m | 0.3 m | 0.3 m |

Classical and non-classical simply supported beam maximum dynamic deflection values (dimensionless) are shown in Table 3 as below.

TABLE 3

| Comparison of classical and non-classical beam measurements with reference values | | | |
|---|---|---|---|
| Parameter | Current Values (Nonclassical boundary conditions) | Current values (Classical boundary conditions) | Reference values |
| Maximum deflection | 0.752 s | 0.752 s | 0.753 s |
| Time of maximum deflection | 1.662 mm | 1.662 mm | 1.709 mm |

Results showed drastic improvement when damping parameters were reduced, but improvements reduced due to the mathematical modelling difference and results of maximum dynamic deflection agree with each other with a precision of 98%. The next section describes a graphical comparison with known values to ensure the results can be utilized in a real-world dynamic damper system.

The graph shown in FIG. 4A shows a plot between a maximum dynamic deflection and a dimensionless critical speed when no fixed damper is attached to the beam 202. Light solid curve 404 and dashed curve 406 illustrate maximum dynamic deflection of the beam presented in the art whereas a heavy solid curve 402 illustrates maximum dynamic deflection of the beam of the experiment. Based upon the plots illustrated in FIG. 4A, the results are in agreement with results from the art. Accordingly, without a damper, the results overlap the results of the prior art.

Figure 4B:
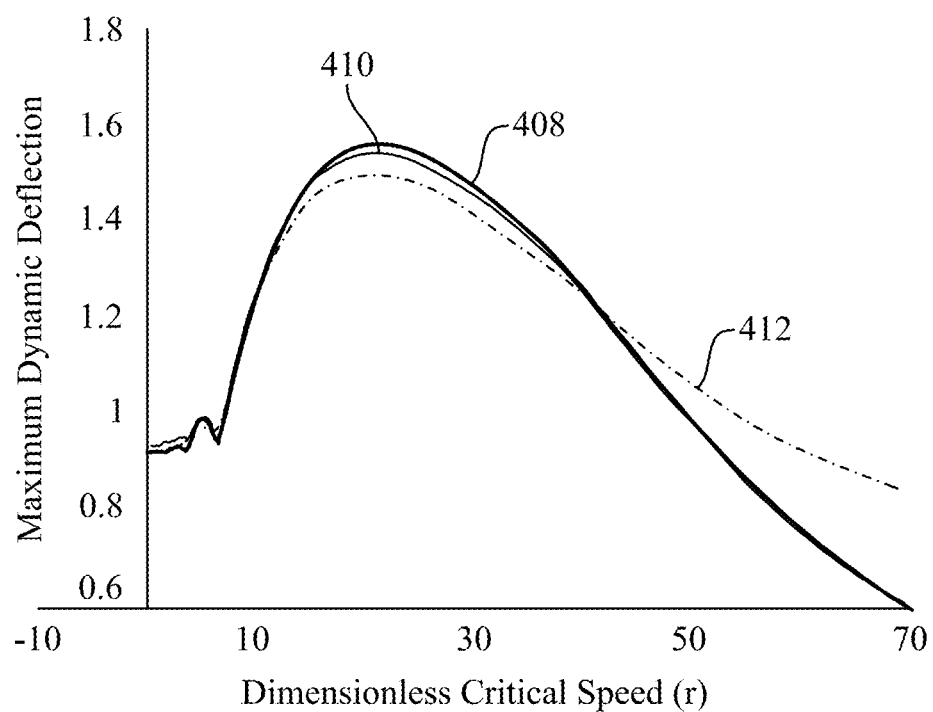
FIG. 4B illustrates the maximum dynamic deflection of non-classical supported beam at mid-span as a function of dimensionless critical speed (r) for single cycle-n when a beam is attached with a fixed damper, according to certain embodiments.

FIG. 4B illustrates a dynamic deflection of non-classical supported beam at mid-span as a function of dimensionless speed (r) for single cycle-n when the beam is attached with a fixed damper and moving load at 61% of critical velocity, according to an aspect of the disclosure. Parameters adopted for linear spring mass damper are same as shown in Table 2. Light solid curve 410 and dashed curve 412 illustrate maximum dynamic deflection of a beam in the known art whereas a heavy solid curve 408 illustrates maximum dynamic deflection of the beam 202 of the experiment of the present disclosure. The heavy solid curve 408 validates the results of the present disclosure and the differences shown in results are minor and are due to mathematical modelling differences.

Figure 5:
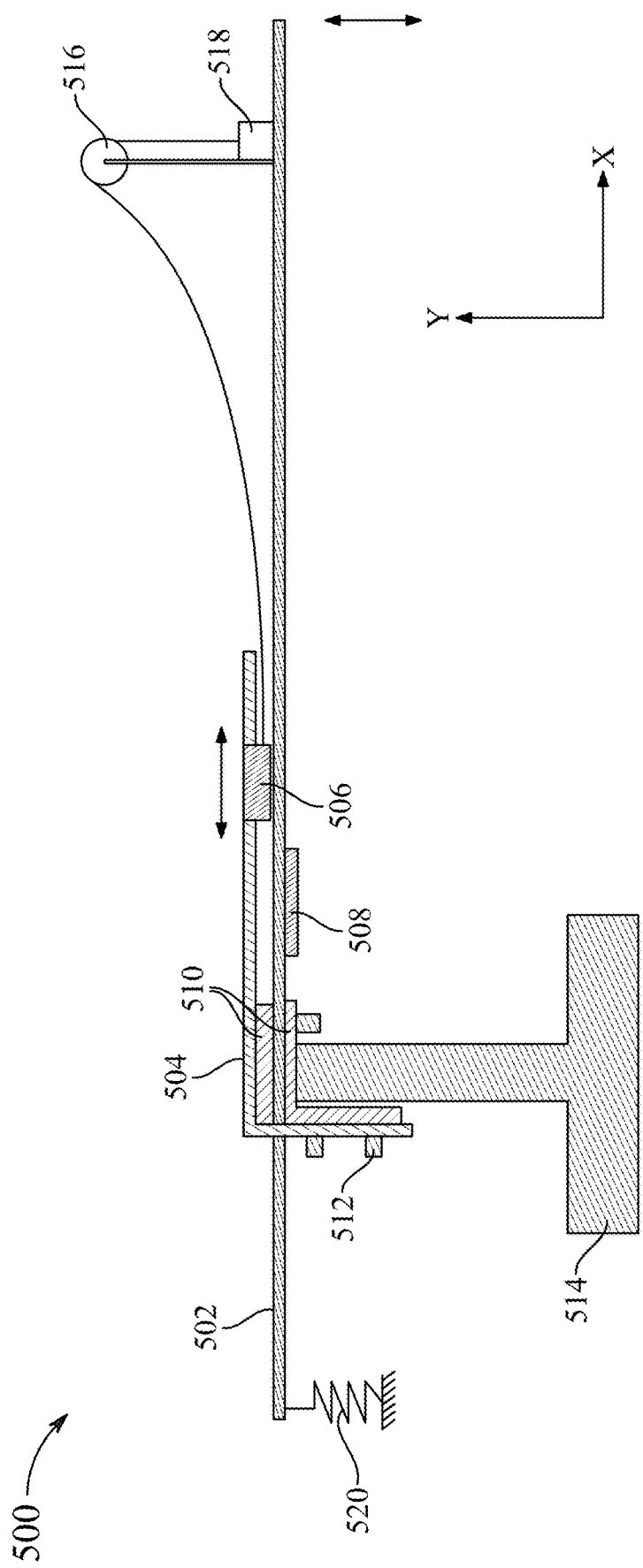
FIG. 5 illustrates an experimental configuration for a deflection occurring at a beam not supported at one end due to a reciprocating mass, according to certain embodiments.

FIG. 5 illustrates an experimental setup to validate the theory of deflection occurring at the beam due to a reciprocating mass. The setup included a cantilever beam 502, a reciprocating motion mechanism 504, a moving load 506 attached to the cantilever beam 502, a piezoelectric plate 508 representing the accelerometer 120 underneath the cantilever beam 502, holding plates 510, fastening bolts 512 and a base support 514. A clamp (having the holding plates 510 and the fastening bolts 512) held the reciprocating motion mechanism 504 and the beam 502 in place. Two cantilever beams (502) of a 1 meter aluminum (or alternatively stainless steel) ruler with thicknesses of 2.5 mm and 1 mm respectively, were used to obtain results for different thicknesses and materials. A beam holder including the holding plates 510 was constructed such that the holding plate 510 was clamped onto the beam 502 to provide control over the beam's length, facilitating the process of testing out different lengths and different thicknesses. Different motor speeds were evaluated to see the effect of a moving load in achieving critical speed and resonance frequency. The moving load 506 was a toy car (not shown) of 53 grams and was fastened onto the cantilever beam 502 using a wheel pulley system 516 connected to a motor 518.

The Euler-Bernoulli beam parameters properties used in the validation are shown in Table 4.

TABLE 4

| Properties of Beam (Aluminium) | | | | |
| --- | --- | --- | --- | --- |
| E | ρ | L | b | h |
| 206.9 GPa | 7820 Kg/m$^3$ | 6 m | 0.03 m | 0.03 m |

Also, the properties of the dynamic linear spring mass damper (using the piezoelectric plate 508) are provided in Table 5 as below.

TABLE 5

| Properties of Linear Spring Mass Damper | | |
| --- | --- | --- |
| m damper | k damper | c damper |
| 2.1114 kg | 286.11 N/m | 9.076 N – s/m |

The cantilever beam 502 was connected with linear spring 520, at the leftmost end of the cantilever beam 502, for example, as support of beams and their stiffness values are varied to see behavior of natural frequencies.

Figure 6:
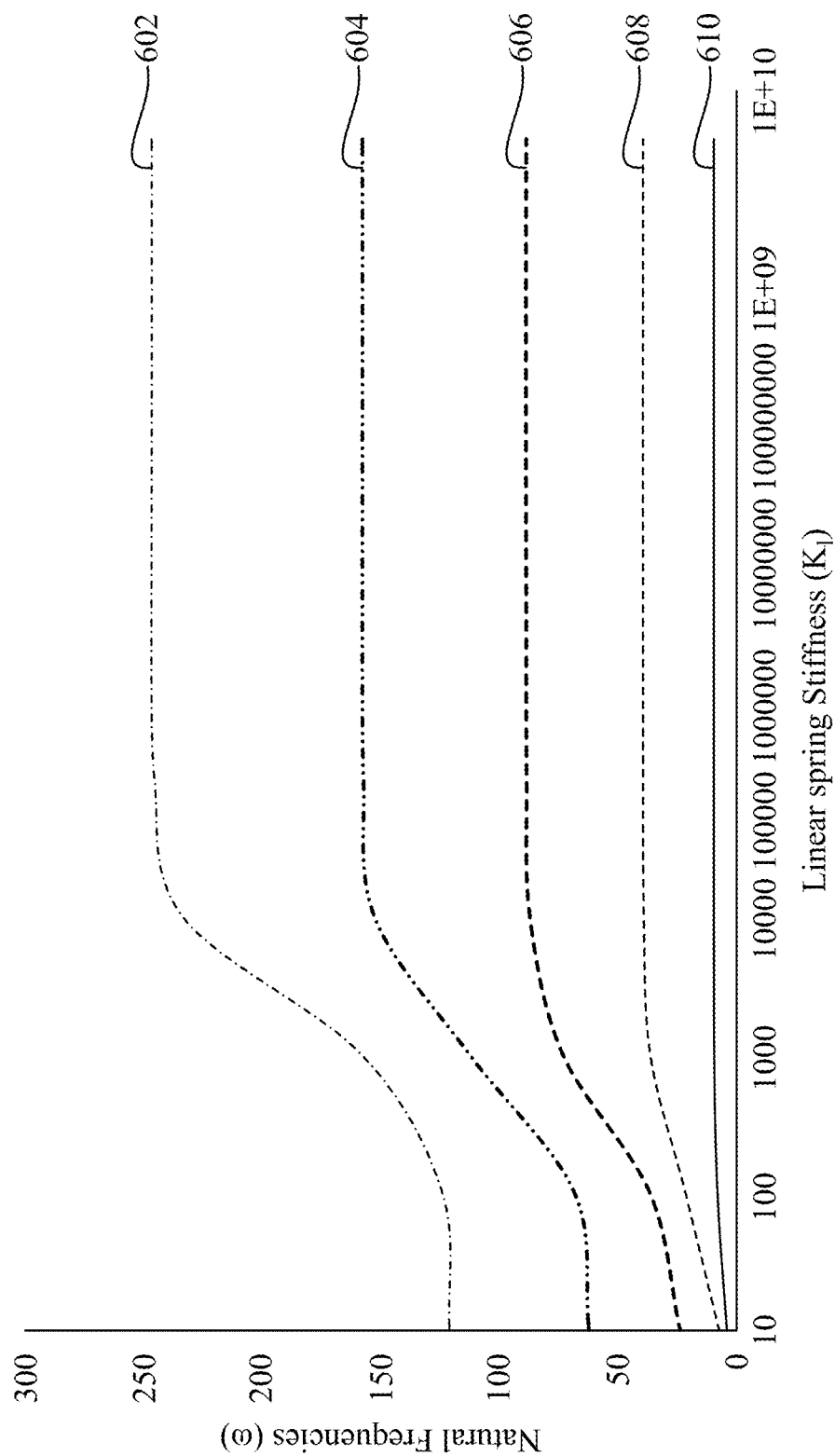
FIG. 6 illustrates a variation of natural frequencies of a cantilever beam with an increase in spring stiffness for five modal shapes, according to certain embodiments.

FIG. 6 illustrates variations in the natural frequencies of the cantilever beam 502 with an increase in spring stiffness for five modal shapes, according to an aspect of the present disclosure. It was observed that in the increase of stiffness values, the natural frequency (w) values became constant at the value of spring stiffness in which the cantilever beam 502 beam started simulating either a simply supported beam, a cantilever, or a free-beam depending on stiffness values of torsional springs and linear springs. The parameters of the cantilever beam 502 are as shown in Table 4. The cantilever beam 502 was connected by linear springs 520 to vary the support of beams and their stiffness values. A curve 602 illustrates a 5$^{th}$ mode natural frequency, a curve 604 illustrates a 4$^{th}$ mode natural frequency, a curve 606 illustrates a 3$^{rd}$ mode natural frequency, a curve 608 illustrates a 2$^{nd}$ mode natural frequency and a curve 610 illustrates a 1$^{st}$ mode natural frequency response at a plurality of linear spring stiffness values ($K_l$). Accordingly, for each mode shape, the value of stiffness ($k_l$) at which the natural frequency (ω) value becomes constant was different, lower mode shapes were attaining constant values of natural frequencies at earlier stage than the higher modes, however each converges to a constant value at high values of spring stiffness.

Figure 7A:
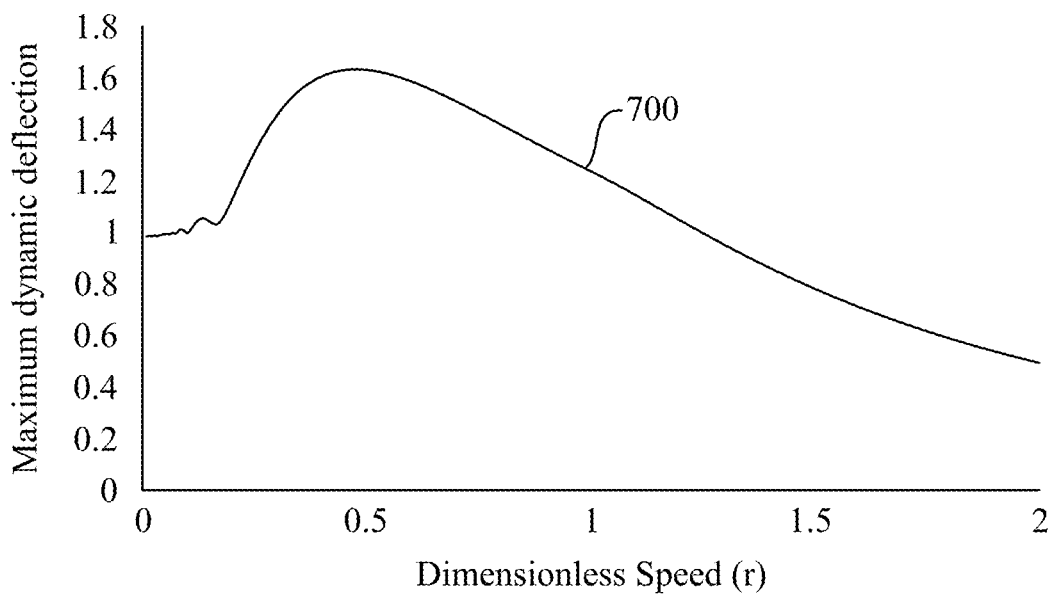
FIG. 7A illustrates a maximum dynamic response for a load moving a full distance (p=1) along a beam without a damper, according to certain embodiments.

The forced vibration response analysis for a nonclassical sinusoidal beam without a dynamic linear spring mass damper 118 is now described in conjunction with FIG. 1. The load 116 travelling on the beam 102 has a sinusoidal motion. The load 116 accelerates at a start point, reaches a maximum speed and then decelerates until it reaches zero at the end of the beam 102. The load 116 is made to travel between the ends of the beam 102 for multiple cycles. Initially, dynamic response for the load that was made to travel a full distance (p=1), reciprocally and periodically between the ends for multiple cycles without dynamic linear spring mass damper was observed. FIG. 7A illustrates a dynamic response for the load travelling full distance (p=1) without the dynamic linear spring mass damper 118. Maximum deflection occurs during this travelling motion. Curve 700 illustrates a response obtained for oscillating load travelling from one end of beam and stopping at the other end. The maximum dynamic deflection was found to occurred with dimensionless speed (r)=$V_f/V_c$=0.475. The dynamic deflection started to decrease moderately with the increase in value of the dimensionless speed (r).

Figure 7B:
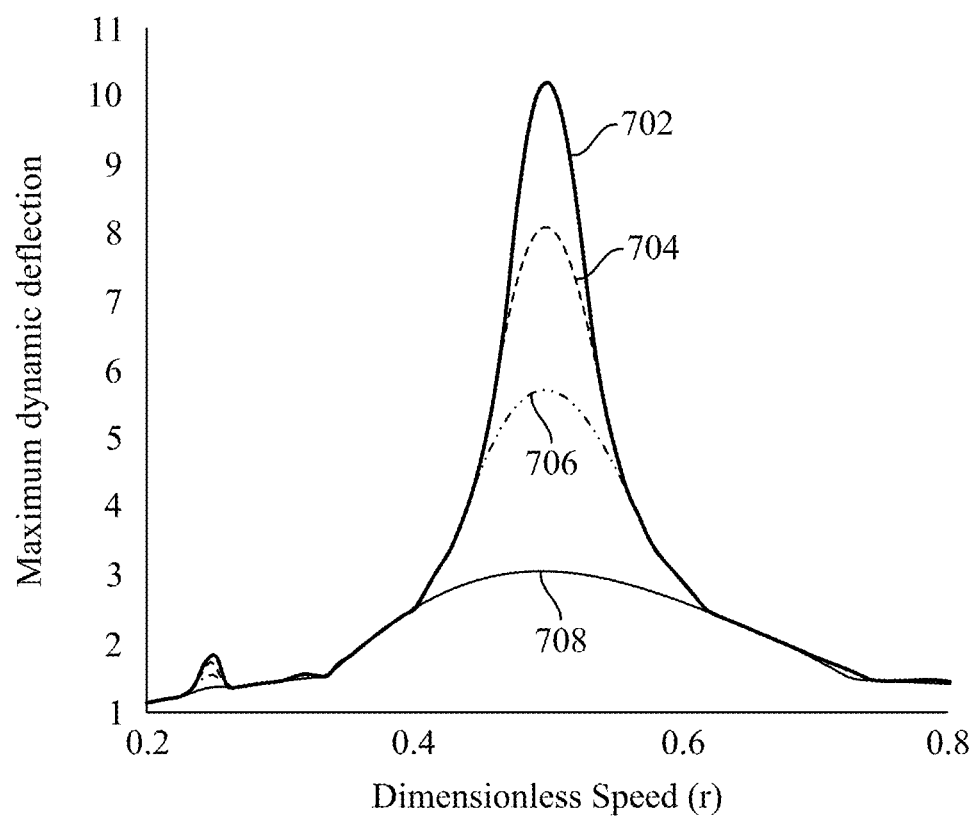
FIG. 7B illustrates a plurality of curves having multiple travelling cycles in which a load moves to an end and comes back to origin, according to certain embodiments.

FIG. 7B illustrates a plurality of curves having multiple travelling cycles in which the load moves to an end (p=x/L=1) and comes back to origin (p=x/L=0) after completing one cycle as 2n (q=cn where n is half cycle and c is a numerical term or counter number of half cycles). Thus travelling of the load to the end of beam and returning to the origin refers to a 4n cycle and a similar pattern occurs for other cycles such as a 6n cycle and an 8n cycle. Accordingly, a curve 702, a curve 704, a curve 706, and a curve 708 represent the 2n cycle, the 4n cycle, the 6n cycle and the 8n cycle, respectively.

Figure 7C:
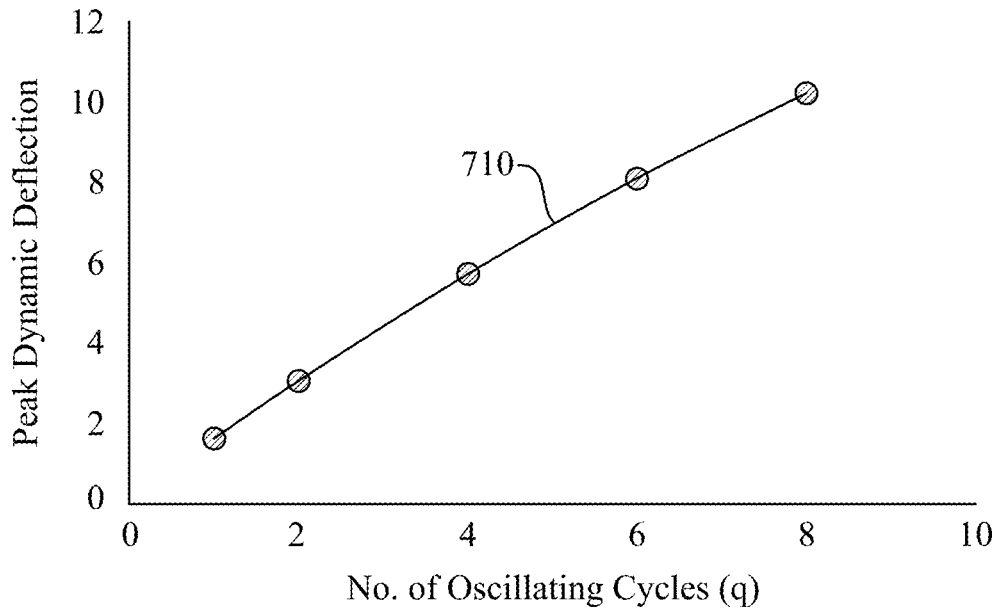
FIG. 7C illustrates a curve representing peak dynamic deflection versus a number of oscillating cycles, according to certain embodiments.
Figure 7D:
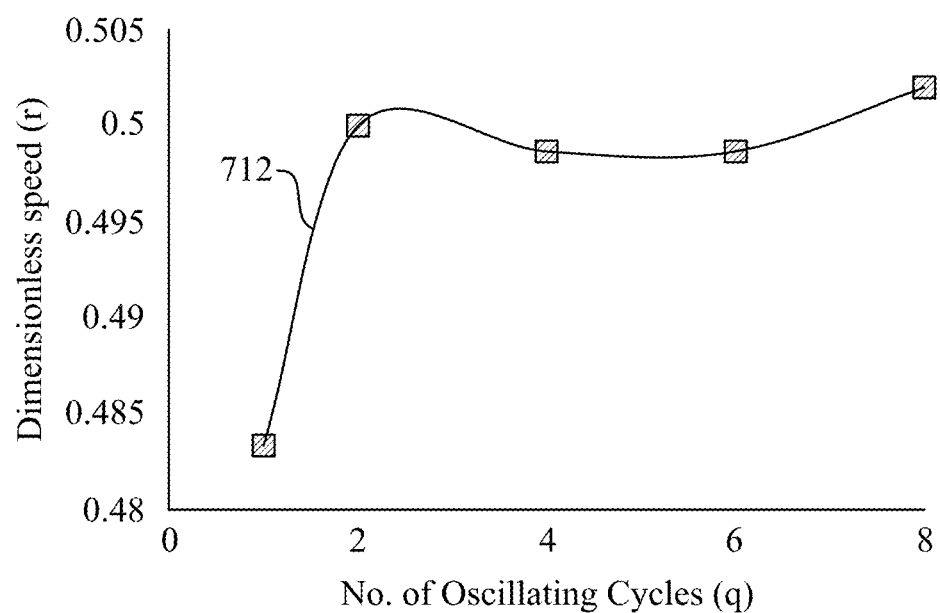
FIG. 7D illustrates a curve representing speed versus number of oscillating cycles, according to certain embodiments.
Figure 7E:
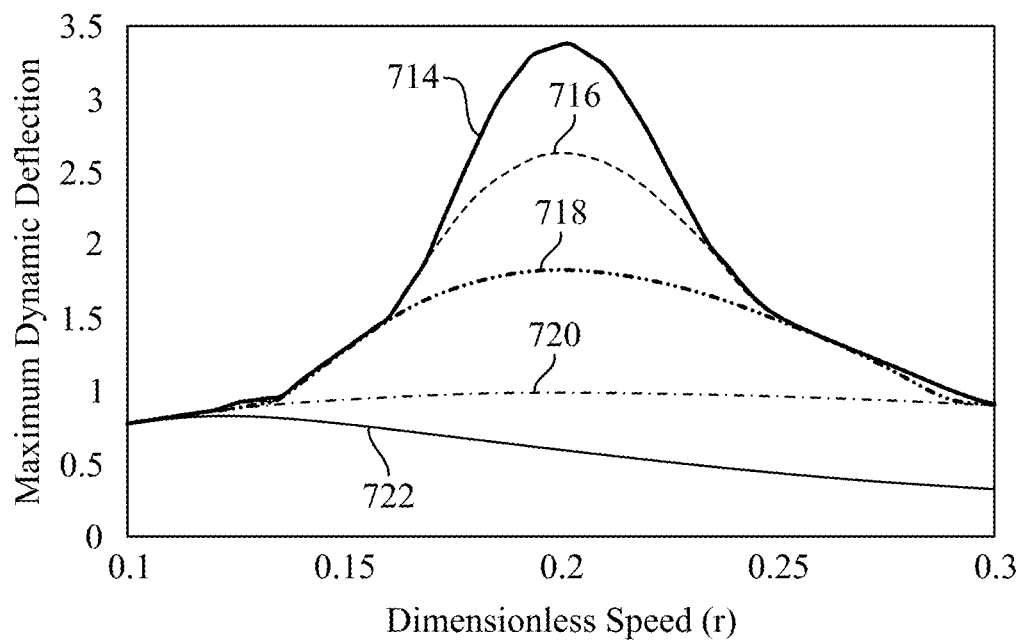
FIG. 7E is a plot depicting maximum dynamic deflection versus dimensionless speed ratio for multiple cycles for p=0.2, according to certain embodiments.

Based on the curve 702 and the curves 704, 706 and 708, it was observed that the travel of the load in multiple cycles amplifies the dynamic deflection of beam 102. FIG. 7C illustrates a curve 710 representing a trend for maximum dynamic deflection with an increase in the number of travelling cycles. FIG. 7D illustrates a curve 712 obtained by plotting maximum dynamic deflections that occurred for different cycles at different dimensionless speeds (r). Accordingly, it was concluded that when the load travels in a forward direction and stops at the end, the maximum deflection peak appears more flattened as there is no cancellation of the deflection due to the load returning to the origin. However, when the number of cycles was increased, the curves showed sharper peaks for dynamic deflections and immediate dropped to lower values as the dampening increased due to a cancellation effect by the same load that returned to the origin. FIG. 7E is a plot depicting maximum dynamic deflection versus dimensionless speed ratio for multiple cycles when p=0.2. A curve 714 illustrates a dynamic deflection at different dimensionless speeds (r) for the n cycle. A curve 716 illustrates a dynamic deflection at different dimensionless speeds (r) for the 2n cycle. A curve 718 illustrates a dynamic deflection at different dimensionless speeds (r) for the 4n cycle. A curve 720 illustrates a dynamic deflection at different dimensionless speeds (r) for the 6n cycle. A curve 722 illustrates a dynamic deflection at different dimensionless speeds (r) for the 8n cycle. It can be observed from FIG. 7E that the maximum dynamic deflection for the cycle n, the cycle 2n, the cycle 4n, and the cycle 6n is found at the dimensionless speed 0.2 r.

Figure 7F:
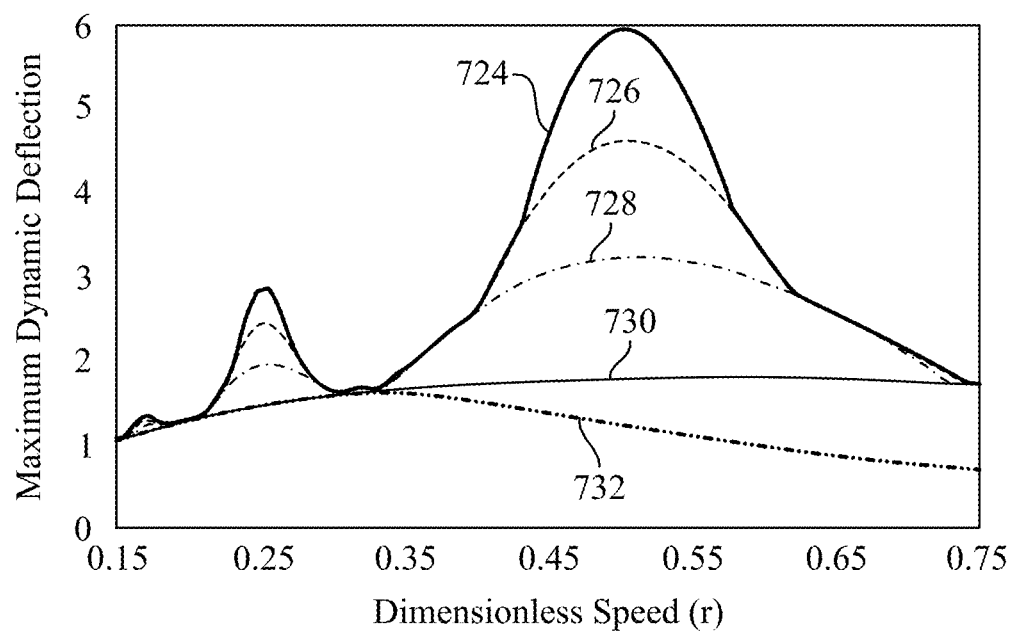
FIG. 7F is a plot depicting maximum dynamic deflection versus dimensionless speed for p=0.5, according to certain embodiments.

Next, the oscillating load travelling on a portion of the beam is described. The load starts at p=x/L=0 and travels a distance x/L<1 along the beam, then travels back to the origin at p=x/L=0, thus covering a complete cycle. Accordingly, the dynamic responses after one complete cycle are plotted for dimensionless critical speed ratios r for different values of dimensionless length parameter p. FIG. 7F illustrates a plurality of curves, such as curve 724, curve 726, curve 728, curve 730 and curve 732 which indicate maximum dynamic deflection versus dimensionless speed (r) for $n^{th}$ cycle, $2n^{th}$ cycle, $4n^{th}$ cycle, $6n^{th}$ cycle and $8n^{th}$ cycle respectively when p=0.5. It can be observed from FIG. 7F that the maximum dynamic deflection for the $n^{th}$ cycle, the $2n^{th}$ cycle, the $4n^{th}$ cycle, and the $6n^{th}$ cycle at p=0.5 is found at about the dimensionless speed 0.5 r.

Figure 7G:
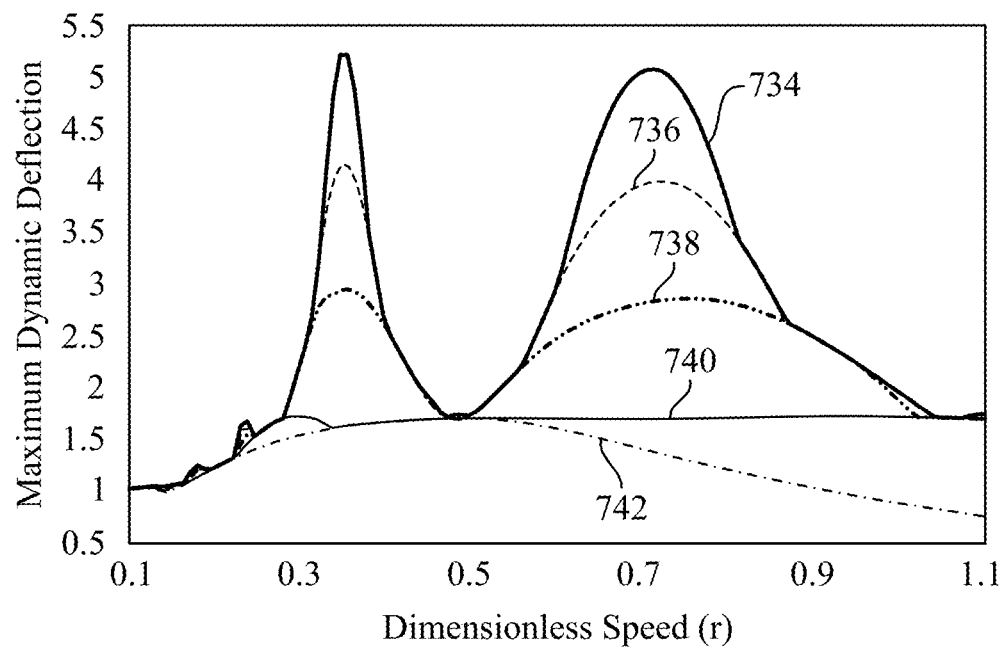
FIG. 7G is a plot depicting maximum dynamic deflection versus dimensionless speed ratio for p=0.7, according to certain embodiments.

FIG. 7G is a plot depicting maximum dynamic deflection versus dimensionless speed (r) for an $n^{th}$ cycle, a $2n^{th}$ cycle, a $4n^{th}$ cycle, a $6n^{th}$ cycle and an $8n^{th}$ cycle when p=0.7. A curve 734, a curve 736, a curve 738, a curve 740 and a curve 742 represent dynamic deflections for the $n^{th}$ cycle, the $2n^{th}$ cycle, the $4n^{th}$ cycle, the $6n^{th}$ cycle and the $8n^{th}$ cycle, respectively, when p=0.7. It can be observed from FIG. 7G that the maximum dynamic deflection for the $n^{th}$ cycle, the $2n^{th}$ cycle, the $4n^{th}$ cycle, and the $6n^{th}$ cycle at p=0.5 is at about the dimensionless speed 0.75 r.

Figure 7H:
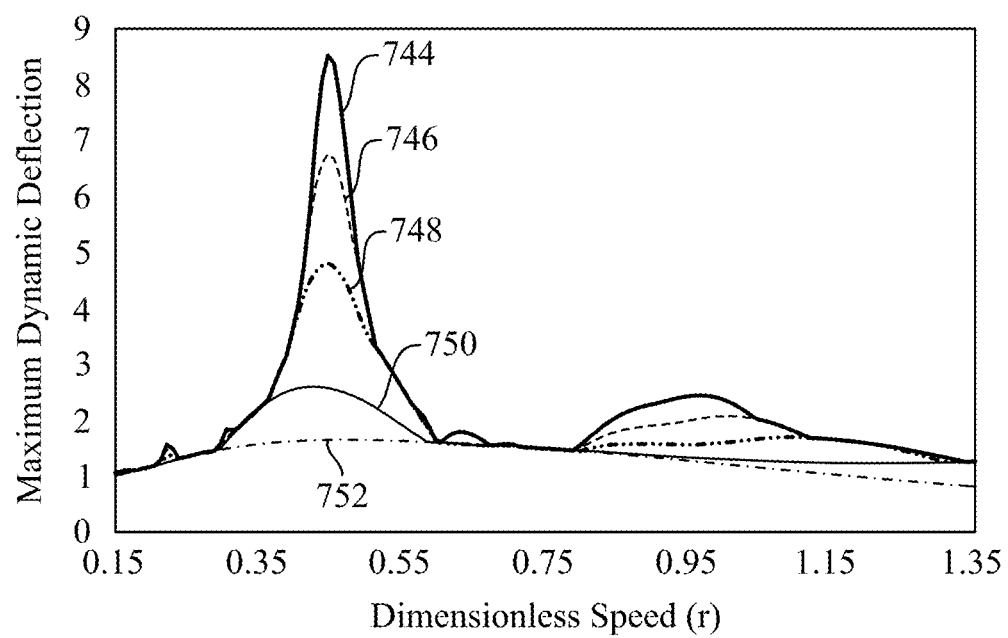
FIG. 7H is a plot depicting maximum dynamic deflection versus dimensionless speed for p=0.9, according to certain embodiments.

FIG. 7H is a plot having a curve 744, a curve 746, a curve 748, a curve 750 and a curve 752 representing dynamic deflection for an $n^{th}$ cycle, a $2n^{th}$ cycle, a $4n^{th}$ cycle, a $6n^{th}$ cycle and an $8n^{th}$ cycle, respectively when p=0.9. It can be observed from FIG. 7H that the maximum dynamic deflection for the $n^{th}$ cycle, the $2n^{th}$ cycle, the $4n^{th}$ cycle, and the $6n^{th}$ cycle at p=0.5 is located at about the dimensionless speed 0.45 r.

Figure 7I:
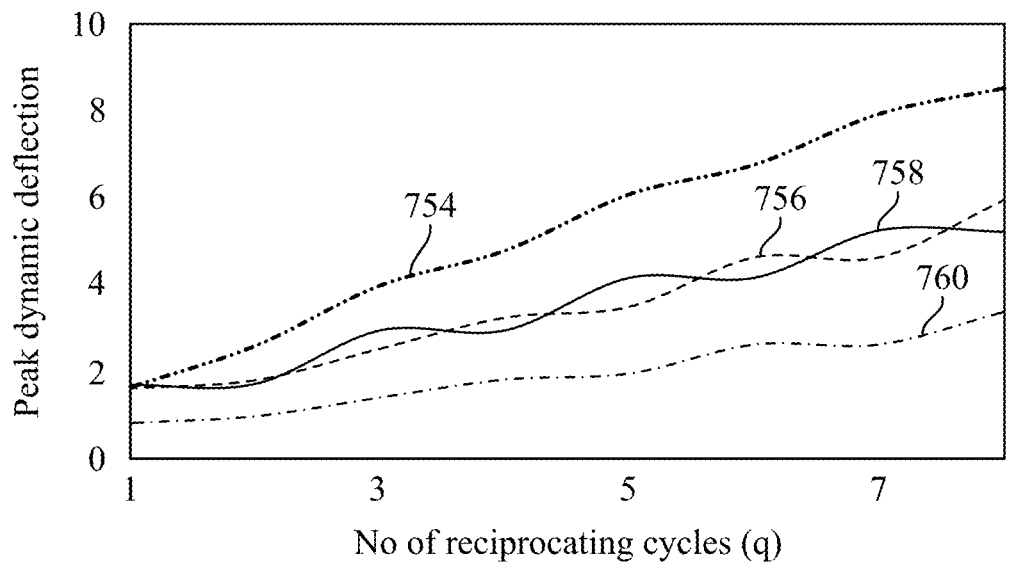
FIG. 7I is a plot of peak dynamic deflection versus number of reciprocating cycles, according to certain embodiments.
Figure 7J:
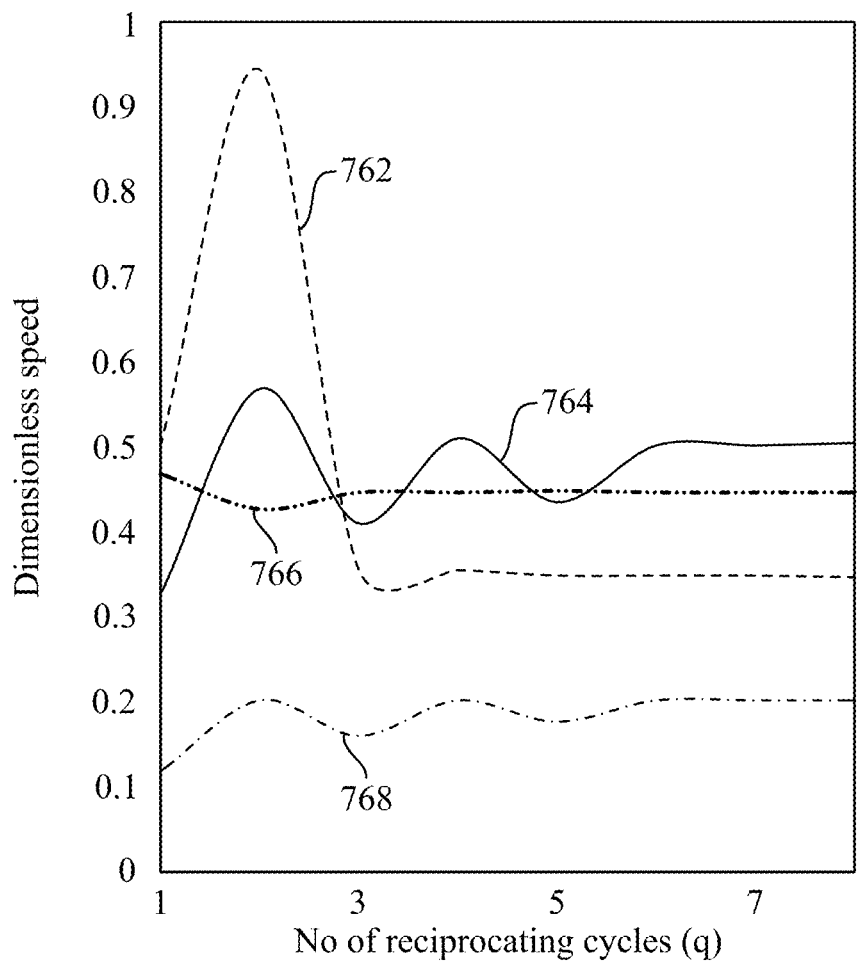
FIG. 7J is a plot depicting a plurality of curves as a function of dimensionless speed versus number of reciprocating cycles, according to certain embodiments.

Based upon curves illustrated in FIG. 7E-FIG. 7H, more than one peak was observed for dynamic deflection when the load was travelling a partial distance with multiple cycles q. The peak values and their corresponding dimensionless speeds (r) were plotted for a multiple number of cycles to derive more insight into variation of peak dynamic deflection with a number of cycles. FIG. 7I is a plot of peak dynamic deflection versus number of reciprocating cycles. A curve 754 represents peak dynamic deflection versus number of reciprocating cycles for p=0.2. A curve 756 represents peak dynamic deflection versus number of reciprocating cycles for p=0.5. A curve 758 represents peak dynamic deflection versus number of reciprocating cycles for p=0.7. A curve 760 represents peak dynamic deflection versus number of reciprocating cycles for p=0.9. Based on the curves 754-760 it was observed that the moving load 116 up to p=0.5 & 0.7, the peak dynamic deflections were in synchronous with each other but with opposite phases. FIG. 7J is a plot illustrating a plurality of curves as a function of dimensionless speed corresponding to peak dynamic deflection for number of reciprocating cycles q=n, 2n, 4n, 6n, 8n. Curve 762 illustrates dimensionless speed corresponding to peak dynamic deflection for multiple cycles at p=0.2. A curve 764 illustrated dimensionless speed corresponding to peak dynamic deflection for multiple cycles at p=0.5. A curve 766 illustrates dimensionless speed corresponding to peak dynamic deflection for multiple cycles at p=0.7. A curve 768 illustrates dimensionless speed corresponding to peak dynamic deflection for multiple cycles at p=0.9. Based upon the curve 762-curve 768, it was observed that the speeds corresponding to maximum dynamic deflections have variations in reference to multiple cycles.

Figure 7K:
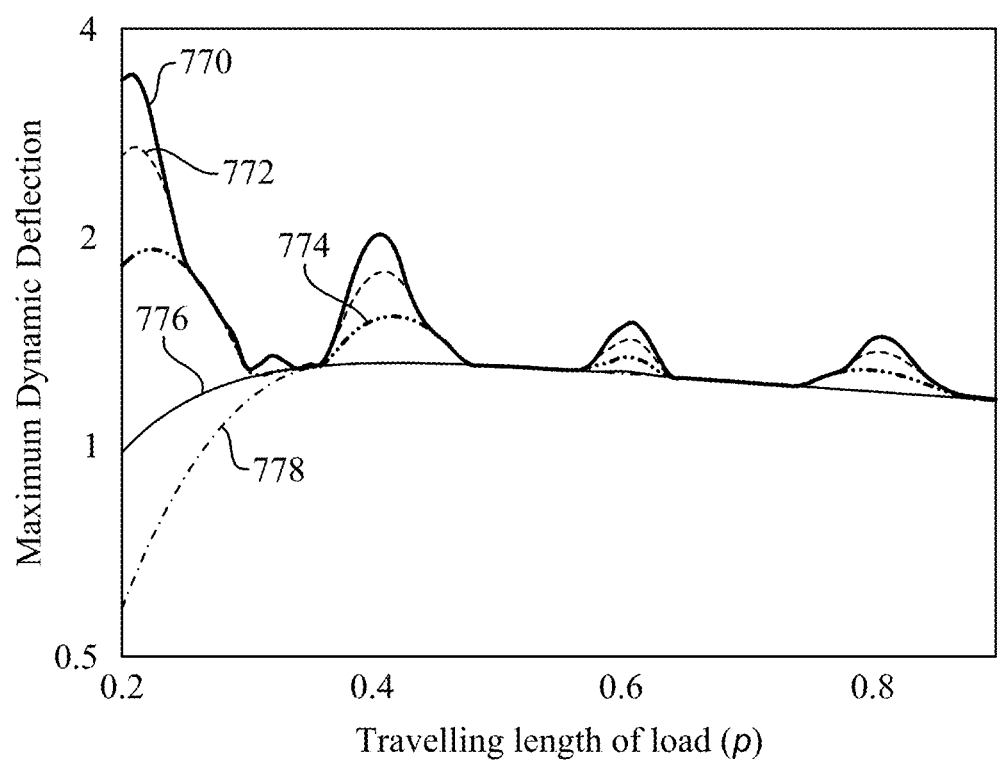
FIG. 7K is a plot depicting maximum dynamic deflection versus travelling length of a load, according to certain embodiments.

FIG. 7K illustrates a graph of maximum dynamic deflection versus travelling length of the load. A curve 770, a curve 772, a curve 774, a curve 776 and a curve 778 represent an $n^{th}$ cycle, a $2n^{th}$ cycle, a $4n^{th}$ cycle, a $6n^{th}$ cycle and an $8n^{th}$ cycle, respectively. Based on the curves 772 through the curves 778, it was observed that for a travel distance less than the midpoint of beam p<0.5, the numerical value of speed for peak deflection is the same as travel distance. However, when the load travels a distance more than the midpoint of beam p>0.5, the numerical value of speed for peak deflection is half of the travel distance on the beam 102. Accordingly, there are two peaks observed at mid-span of the beam, one when the load travels to the original travel points p and other at multiple of p. To analyze this observation further, r=0.202 was used and its effect on the rest of travel distance of the beam 102 was checked. As a result, the maximum deflection peaks were observed at p=0.2 of travel distance. However, smaller peaks were observed at even multiples of 0.2 along the remaining length parameter of beam 102.

To evaluate the setup of FIG. 5, a preliminary setup consisting of C clamps was used to see the effect of the reciprocating load on the cantilever beam 502. The clamps supported both the mechanism and beam 502 in place whereas an ink holder was used as the weight. After verifying the effect that the load 506 had on the beam 502, a base was manufactured and assembled with both the mechanism and the beam 502 to perform accurate tests. A mass that was used to replace the load in the final assembly was a plastic car weighing 53 grams. This car was mechanically fastened onto a rod, also known as a link, which is connected to the wheel pulley system 516 which yields the reciprocating motion.

As can be observed from Table 1, the length required to achieve resonance with a fixed velocity is smaller as the thickness of beams (502) becomes smaller. As shown in the FIG. 7B, the peaks that were achieved for these smaller η values correspond to fractions of first peak. However, it was sufficient to achieve a fraction of the first peak as long as the conditions provided at least achieved one of the available peaks, since the main objective was to run the car at a velocity that provides increasing frequency rather than providing a cancelation frequency. Experimentally, for the same length and changing the η value, then the available results are as presented in Table 6 below:

TABLE 6

Showing the effect of n experimentally

| Aluminum | Δx | n | Δv(cm) |
|---|---|---|---|
| H = 2.5 mm<br>L = 112 cm | 18 | 0.1607 | 10 |
| | 19 | 0.1696 | 18 |
| | 20 | 0.1786 | 5 |

Table 6 shows that there are peaks that purely depend on the value of η if other parameters, such as velocity, are fixed. Therefore, covering a smaller range on the beam leads to a cancellation frequency as indicated by the much smaller value in deflection. The results that were found experimentally were compared to theoretical results, as shown in Table 7 below:

TABLE 7

Experimental vs. Theoretical Results

|  | L (cm) | H (mm) | Δx (cm) | η | Δy (cm) |
| --- | --- | --- | --- | --- | --- |
| Experimental | 46 | 1 | 10 | 0.2174 | 21 |
| Theoretical | 42.5 | 1 | 8.501 | 0.2 | NA |

There is some difference between the two results obtained. The theoretical system assumes that the beam has zero initial deflection, but in reality, there is an initial deflection that is caused by the weight of the beam itself.

Figure 8:
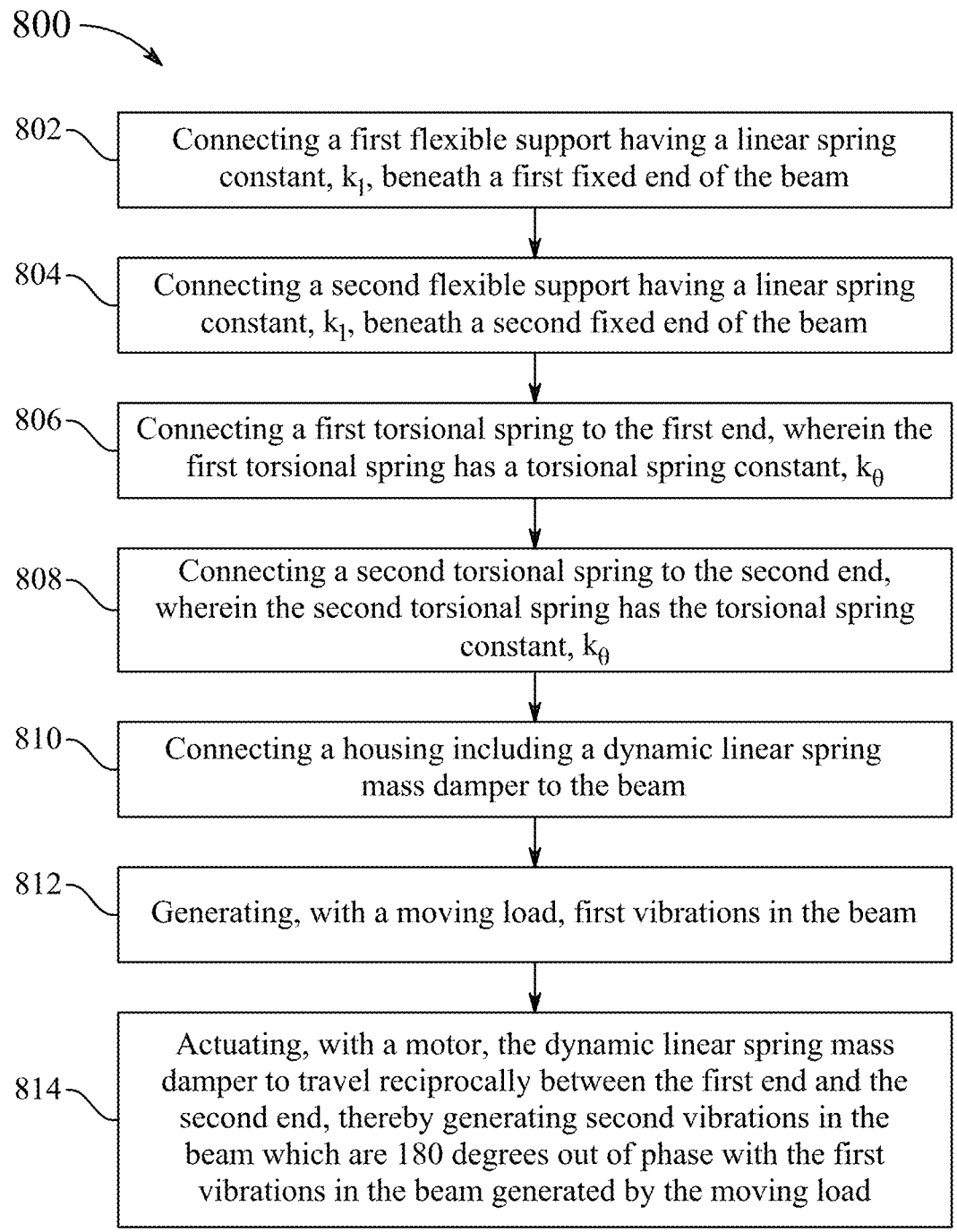
FIG. 8 illustrates a flowchart of a method for damping vibrations in a beam traversed by a moving load, according to certain embodiments.

FIG. 8 illustrates a flowchart of a method 800 for damping vibrations in a beam 102 traversed by a moving load 116. The method 800 is described in conjunction with FIG. 1A-FIG. 1C and the experimental observations provided in FIG. 2-FIG. 7. Various steps of the method 800 are included through the steps in FIG. 8.

At step 802, the method 800 includes connecting a first flexible support 108 having a linear spring constant, $k_j$, beneath a first fixed end 104 of the beam 102.

At step 804, the method 800 includes connecting a second flexible support 110 having a linear spring constant, $k_j$, beneath a second fixed end 106 of the beam 102.

At step 806, the method 800 includes connecting a first torsional spring 112 to the first end 104. The first torsional spring 112 has a torsional spring constant, $k_\theta$.

At step 808, the method 800 includes connecting a second torsional spring 114 to the second end 10. The second torsional spring 114 has the torsional spring constant, $k_\theta$.

At step 810, the method 800 includes connecting a housing 124 including the dynamic linear spring mass damper 118 to the beam 102. The housing 124 is configured to encase or surround plurality of components of the dynamic linear spring mass damper 118. A plurality of components include, but are not limited to wheels 126 to be engaged with the track 122, motor 130, the position sensor 134, the spring 136, the mass 138, the dashpot 140, the second accelerometer 132, the battery 142, the microcontroller 144 including the circuitry 146 and memory 148 of the microcontroller 144. The memory 148 is configured to store the force equation F(x, t).

At step 812, the method 800 includes generating, with the moving load 116, first vibrations in the beam 102. The first vibrations may include vibrations occurring at the fundamental frequency at the midpoint of the beam 102 as well as vibrations occurring at other frequencies of the beam 102. In an aspect, the fixed spring mass damper 152 may be attached underneath the beam 102 for dampening the fundamental frequency of the first vibrations.

At step 814, the method 800 includes actuating, with the motor 130, the dynamic linear spring mass damper 118 to travel reciprocally between the first end 104 and the second end 106, thereby generating second vibrations in the beam which are 180 degrees out of phase with the first vibrations in the beam generated by the moving load 116. In an aspect, the dynamic linear spring mass damper 118 is configured to tune the second vibrations by modifying the speed and the travel distance of the dynamic linear spring mass damper 118 that produces the second vibrations at phases which is at 180 degree phase of the first vibrations due to the moving load 116, thereby damping the first vibrations in the beam 102.

The first embodiment is illustrated with respect to FIGS. 1A-1C. The first embodiment describes a dynamic damper system 100. The dynamic damper system 100 includes a beam 102 having a first fixed end 104, a second fixed end 106, a width and a thickness; a first flexible support 108 connected to the beam 102 beneath the first end 104, wherein the first flexible support 108 has a linear spring constant, $k_j$; a second flexible support 110 connected to the beam 102 beneath the second end 106, wherein the second flexible support 110 has the linear spring constant, $k_j$; a first torsional spring 112 connected to the first end 104, wherein the first torsional spring 112 has a torsional spring constant, $k_\theta$; a second torsional spring 114 connected to the second end 106, wherein the second torsional spring 114 has the torsional spring constant, $k_\theta$; a moving load 116 configured to traverse the beam 102 reciprocally from the first end 104 to the second end 106, wherein the moving load generates first vibrations in the beam 102; and a dynamic linear spring mass damper 118 connected to the beam 102, wherein the dynamic linear spring mass damper 118 is configured to travel reciprocally between the first end 104 and the second end 106, wherein the travel of the dynamic linear spring mass damper 118 is configured to generate second vibrations in the beam 102 which are 180 degrees out of phase with the first vibrations.

In an aspect, a first accelerometer 120 is connected to the beam 102, wherein the first accelerometer 120 is configured to measure the first vibrations generated by the moving load 116, and generate first vibration signals in response to the first vibrations.

In an aspect, the dynamic damper system 100 further includes a track 122 located on an underside of the beam 102, wherein the track 122 extends from the first end 104 to the second end 106; a housing 124 surrounding the dynamic linear spring mass damper 118; a plurality of wheels 126 attached to an upper exterior surface 124U of the housing 124, wherein the wheels 126 are configured to engage with the track 122; a motor 130 electrically connected to the wheels 126, wherein the motor 130 is configured to turn the wheels 126; a second accelerometer 132 located within the dynamic linear spring mass damper 118, wherein the second accelerometer 132 is configured to generate second vibration signals; a position sensor 134 configured to measure a distance of the housing 124 from the first end 104, and generate position signals; a spring 136, $s_d$, connected at a first end 104 to an upper interior surface of the housing, wherein the spring 136 has a spring constant, $k_d$; a mass 138, $m_d$, connected to a second end of the spring 136; a dashpot 140 having a dashpot coefficient of stiffness, $c_d$, connected in parallel with the spring 136; a battery 142; and a microcontroller 144 connected to the motor 130, the battery 142, the position sensor 134, the first accelerometer 120, and the second accelerometer 132, wherein the microcontroller 144 is configured to calculate the speed and travel distance based on the first vibration signals, the second vibration signals and the position signals, and generate drive signals to actuate the motor 130 based on the first vibration signals, the second vibration signals and the position signals.

In an aspect, the microcontroller 144 includes a circuitry 146, a memory 148 storing program instructions, and at least one processor 150, wherein the program instructions include a Fourier transform, and the at least one processor 150 is configured to use the Fourier transform to transform the first vibration signals, the second vibration signals and the position signals to a frequency space.

In an aspect, microcontroller 144 is further configured to calculate a force, F(x, t) of the moving load 116 on the beam 102 based on a weighted sum of a fourth partial derivative with respect to position of a frequency of the moving load 116, a first partial derivative with respect to position of the frequency of the moving load 116, a second partial derivative with respect to time of the moving load 116, a displacement of the mass 138 due to the second vibrations multiplied by a Fourier transform of a second force, G(x, t), on the beam 102 generated by the second vibrations of the dynamic linear spring mass damper 118, and a first derivative of the displacement of the mass 138 due to the second vibrations multiplied by the second force on the beam 102 generated by the second vibrations of the dynamic linear spring mass damper 118.

In an aspect, the force F(x, t) of the moving load 116 on the beam 102 is given by:

$$F(x, t) = \rho bh \left( \frac{EI}{\rho bh} \frac{\partial^4 \dot{w}(x, t)}{\partial \dot{x}^4} + \frac{c_b}{\rho bh} \frac{\partial \dot{w}(x, t)}{\partial \dot{x}} + \frac{\partial^2 \dot{w}(x, t)}{\partial t^2} + \left( \frac{k_d}{\rho bh} \dot{u}(t) + \frac{c_d}{\rho bh} \frac{d\dot{u}(t)}{dt} \right) \dot{G}(x, t) \right)$$

In an aspect, the microcontroller 144 is configured to calculate the speed and travel distance of the dynamic linear spring mass damper 118 needed to dampen the vibrations based on the force, F(x, t).

In an aspect, the drive signals are configured to actuate the wheels 126 to rotate at a rotational speed on the track 122 such that the dynamic linear spring mass damper 118 moves at a velocity equal to a speed of the moving load 116.

In an aspect, the drive signals are configured to actuate the wheels 126 to rotate in a direction which moves the dynamic linear spring mass damper 118 in a same direction of travel as the moving load 116.

In an aspect, the drive signals are configured to actuate the wheels 126 to rotate in a direction which moves the dynamic linear spring mass damper 118 in an opposite direction of travel as the moving load 116.

In an aspect, the dynamic damper system 100 further includes a first fixed spring mass damper 168 connected to the underside of the beam 102 halfway between the first end 104 and the second end 106, wherein the first fixed spring mass damper 168 is attached to a first side 164 of the beam 102 spaced from the track 122; and a second fixed spring mass damper 170 connected to the underside of the beam 102 halfway between the first end 104 and the second end 106, wherein the second fixed spring mass damper 170 is attached to a second side 166 of the beam 102 spaced from the track 122; wherein the first side 164 is opposite the second side 166, wherein the first fixed spring mass damper 168 and the second fixed spring mass damper 170 are configured to generate third vibrations and fourth vibrations, respectively, which together dampen a fundamental frequency of the beam 102.

In an aspect, the dynamic damper system 100 further includes a fixed spring mass damper 152 connected to the underside of the beam 102 halfway between the first end 104 and the second end 106, wherein the fixed spring mass damper 152 is configured to generate third vibrations which dampen a fundamental frequency of the beam 102.

In an aspect, the fixed spring mass damper 152 includes a mounting plate 154 connected to the underside of the beam 102; a spring 156 $s_f$, connected to the mounting plate 154, wherein the spring has a spring constant, $k_f$; a mass 158, $m_f$, connected to a second end of the spring 156; an accelerometer 160 connected to the mass 158, wherein the accelerometer 160 is configured to measure a fundamental frequency of the beam 102; a dashpot 162, having a dashpot coefficient of stiffness, $c_f$, connected in parallel with the spring 156, wherein the spring constant, $k_f$, the mass 158, and the coefficient of stiffness, $c_f$, are selected such that third vibrations of the fixed spring mass damper 152 are 180 degrees out of phase with the fundamental frequency of the beam 102.

The second embodiment is illustrated with respect to FIGS. 1A-1C. The second embodiment describes a method for damping vibrations in a beam 102 traversed by a moving load 116. The method includes connecting a first flexible support 108 having a linear spring constant, $k_l$, beneath a first fixed end 104 of the beam 102. The method further includes connecting a second flexible support 110 having a linear spring constant, $k_l$, beneath a second fixed end 106 of the beam 102. The method further includes connecting a first torsional spring 112 to the first end 104, wherein the first torsional spring 112 has a torsional spring constant, $k_\theta$. The method further includes connecting a second torsional spring 114 to the second end 106, wherein the second torsional spring 114 has the torsional spring constant, $k_\theta$. The method further includes connecting a housing 124 including a dynamic linear spring mass damper 118 to the beam 102. The method further includes generating, with the moving load 116, first vibrations in the beam 102. The method further includes actuating, with the motor 130, the dynamic linear spring mass damper 118 to travel reciprocally between the first end 104 and the second end 106, thereby generating second vibrations in the beam 102 which are 180 degrees out of phase with the first vibrations.

In an aspect, the method further includes, measuring, with a first accelerometer 120 connected to a midpoint of the beam 102, a fundamental frequency of the beam 102. The method further includes connecting a fixed spring mass damper 152 to an underside of the beam 102 at a midpoint of the beam 102. The method further includes generating, with the fixed spring mass damper 152, third vibrations which are 180 degrees out of phase with the fundamental frequency. The method further include attaching a track 122 to the underside of the beam 102, wherein the track 122 extends from the first end 104 to the second end 106. The method further include attaching a plurality of wheels 126 to an upper exterior surface 124U of the dynamic linear spring mass damper housing 124, wherein the wheels 126 are configured to engage with the track 122. The method further include installing a motor 130 in the dynamic linear spring mass damper housing 124. The method further include connecting the motor 130 to the wheels 126. The method further include installing a battery 142 in the dynamic linear spring mass damper housing 124. The method further include generating, with a microcontroller 144 connected to the motor 130 and the battery 142, drive signals to actuate the motor 130.

In an aspect, the method further includes installing a position sensor 134 in the dynamic linear spring mass damper housing 124. The method further include measuring, with the position sensor 134, a distance of the dynamic linear spring mass damper housing 124 from the first end 104, and generating position signals. The method further includes installing a second accelerometer 132 in the dynamic linear spring mass damper housing 124, wherein the second accelerometer 132 is connected to the dynamic linear spring mass damper 118, and generating second vibration signals. The method further includes calculating, by the microcontroller 144, the speed and travel distance based on the first vibration signals, the second vibration signals and the position signals. The method further include generating, by the microcontroller 144, the drive signals based on the first vibration signals, the second vibration signals and the position signals.

In an aspect, the method further includes actuating, by the microcontroller 144, the wheels 126 to rotate in a direction which moves the dynamic linear spring mass damper 118 in one of a same direction of travel as the moving load 116 and an opposite direction of travel as the moving load 116.

In an aspect, the method further includes calculating, by the microcontroller 144, a force, $F(x, t)$ of the moving load 116 on the beam 102 based on a weighted sum of a fourth partial derivative with respect to position of a frequency of the moving load 116, a first partial derivative with respect to position of a frequency of the moving load 116, a second partial derivative with respect to time of the moving load 116, a displacement of the mass 138 due to the second vibrations multiplied by a Fourier transform of a second force, $G(x, t)$, on the beam 102 generated by the second vibrations of the dynamic linear spring mass damper 118, and a first derivative of the displacement of the mass 138 due to the second vibrations multiplied by the second force on the beam 102 generated by the second vibrations of the dynamic linear spring mass damper 118. The method further include calculating the speed and travel distance of the dynamic linear spring mass damper 118 needed to dampen the vibrations based on the force, $F(x, t)$.

The third embodiment is illustrated with respect to FIGS. 1A-1C. The third embodiment describes a non-transitory computer readable medium having program instructions stored therein that, when executed by one or more processors 150, cause the one or more processors 150 to perform a method for damping vibrations in a beam 102 traversed by a moving load 116. The method include receiving first vibration signals generated by a first accelerometer 120 connected to the beam 102. The method further includes connecting a dynamic linear spring mass damper 118 to the beam 102. The method further includes receiving second vibration signals generated by a second accelerometer 132 of a dynamic linear spring mass damper 118 The method further includes receiving position signals from a position sensor 134 connected to a housing 124 of the dynamic linear spring mass damper 118. The method further includes Fourier transforming the first vibration signals, the second vibration signals and the position signals to a frequency space. The method further includes calculating a force, $F(x, t)$ of the moving load 116 on the beam 102 based on a weighted sum of a fourth partial derivative with respect to position of a frequency of the moving load 116, a first partial derivative with respect to position of the frequency of the moving load 116, a second partial derivative with respect to time of the frequency of the moving load 116, a displacement of a mass 138 of the dynamic linear spring mass damper 118 due to the second vibrations multiplied by a Fourier transform of a second force, $G(x, t)$, on the beam 102 generated by the second vibrations of the dynamic linear spring mass damper 118, and a first derivative of the displacement of the mass 138 due to the second vibrations multiplied by the second force on the beam 102 generated by the second vibrations of the dynamic linear spring mass damper 118. The method further include calculating the speed and travel distance of the dynamic linear spring mass damper 118 needed to dampen the vibrations based on the force, $F(x, t)$.

The present disclosure describes the dynamic response of an elastic beam having flexible boundary conditions being subjected to a sinusoidal load which reciprocates during multiple cycles to full beam length and partial beam length. Closed-form expressions were derived to model the behavior and obtain parameters for designing the dynamic damper system. It was observed that when the moving force reciprocates across the entire span or partial travel length of the beam, there are many critical speeds which exist depending on the travel length. The plurality of speeds can be seen as increasing for both a non-classical simply supported beam and a cantilever beam. From observations, it is understood that the critical speed defined in the conventional theory of a single direction moving load acts as cancellation speed depending on travel length in current study of a reciprocating sinusoidal load. In terms of resonance, the critical speed value for full travel is half of dimensionless length traversed in terms of value and stays the same for higher cycles but varies slightly when moving to lower cycles. The analysis indicated that dynamic deflection and critical speeds increase as the dimensionless length ratio (p) increases for both nonclassical simply supported and cantilever beam. These observations are noted without any damper attached in the system. When the dynamic linear spring mass damper was attached, a shift was observed in amplification inducing critical speeds with the damping improving at higher cycles of the load reciprocating cycle. It was observed that even if the load is sinusoidal and reciprocating, the best location of spring mass damper for simply supported beam was in the middle of the beam. In a case for the cantilever beam, the most appropriate location was at the tip of the beam.

Aspects of the present disclosure may include both vibration suppression and energy harvesting. The dimensionless speed ratio, deflection magnitude and dimensionless length ratio of the applied load can all be adjusted to manage the dynamic deflection. Considerable dynamic deflection may be achieved when the length ratio is kept low to reduce displacement in vertical directions at the load application range. The magnification and dampening control of vibrations, control of flexible supported beams and cantilever beam that are traversed by moving loads and controlled by a fixed or dynamic linear spring mass damper with synchronized or unsynchronized travel motion with the load, plays critical role in efficient energy consumption and harvesting or recycling applications in eco-friendly structural machineries, bridges or railway tracks.

To this end, the dynamic damper system of the present disclosure may be used to construct reciprocating absorbers to suppress or amplify the dynamic response in structures such as beams. The amplitude of the dynamic response can be controlled by moving the dynamic linear spring mass damper at a calculated speed and over a calculated travel length. The dampening of this movement by the dynamic mass spring damper in a synchronized or unsynchronized motion with the source of vibration can be applied to fields such as energy harvesting, electric power generation, vibration suppression in bridges and the like. The dynamic linear spring mass damper of the present disclosure may be used to build an auxiliary damping device that can be attached to a dynamic system to control the deflection magnitude. The speed, travel distance and mass of the dynamic linear spring mass damper can be adjusted to manage the dynamic deflection for variable input parameters.

Figure 9:
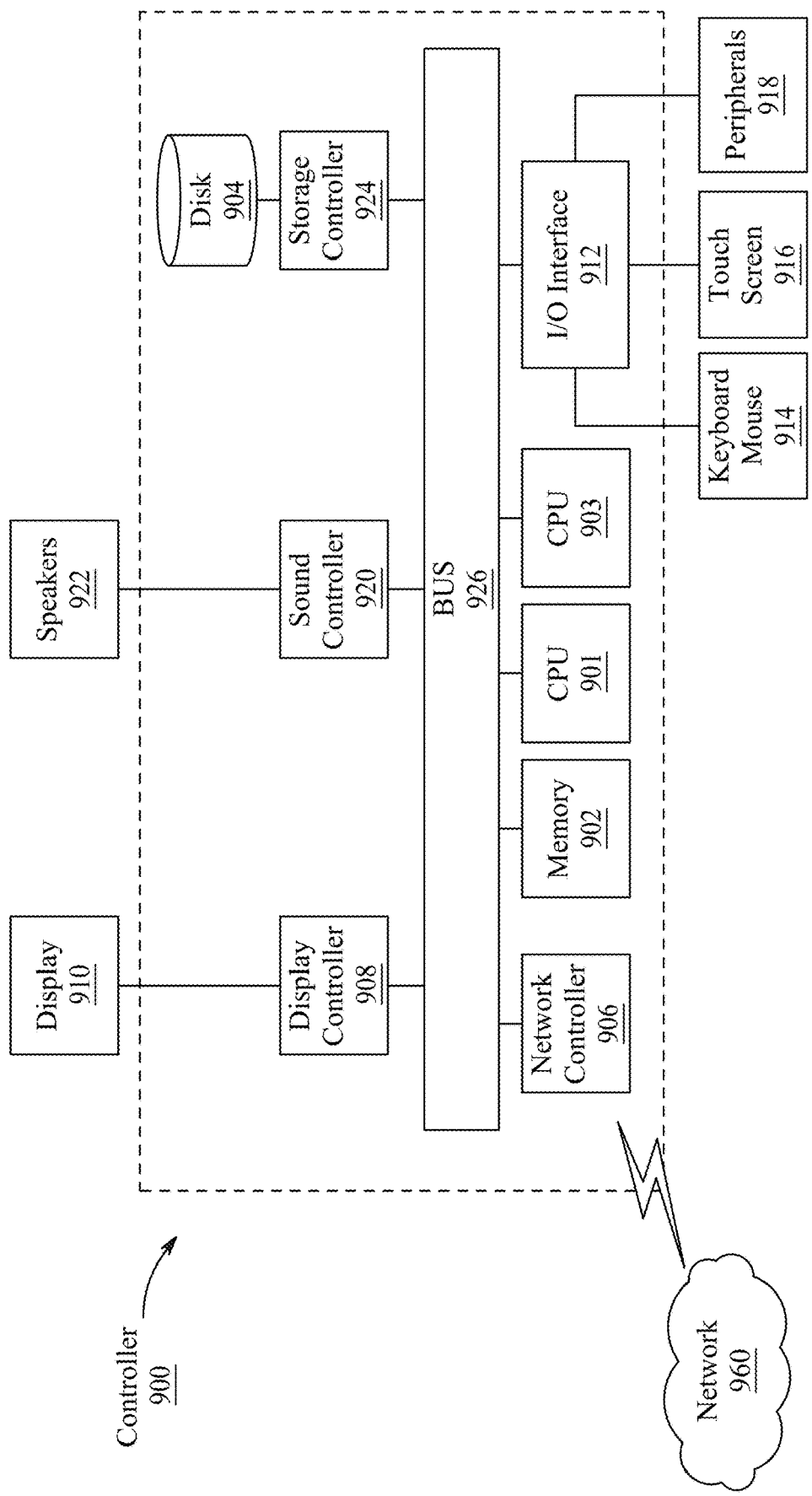
FIG. 9 is an illustration of a non-limiting example of details of computing hardware used in the computing system, according to certain embodiments.

Next, further details of the hardware description of the computing environment according to exemplary embodiments is described with reference to FIG. 9. In FIG. 9, a controller 900 is described is representative of the microcontroller 144 of FIG. 1 in which the controller 900 includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
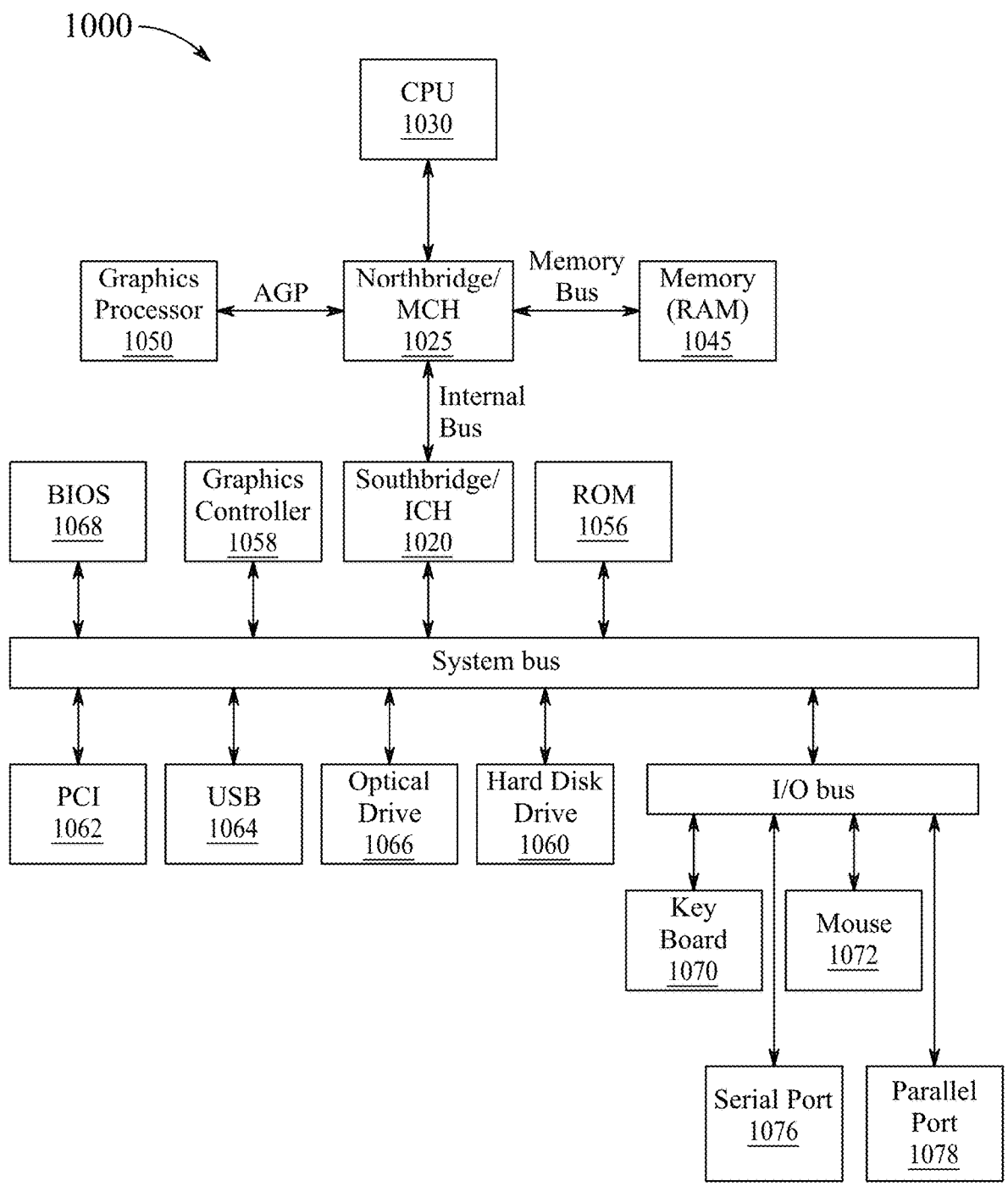
FIG. 10 is an exemplary schematic diagram of a data processing system used within the computing system, according to certain embodiments.

FIG. 10 shows a schematic diagram of a data processing system, according to certain aspects, for performing the functions of the exemplary aspects. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
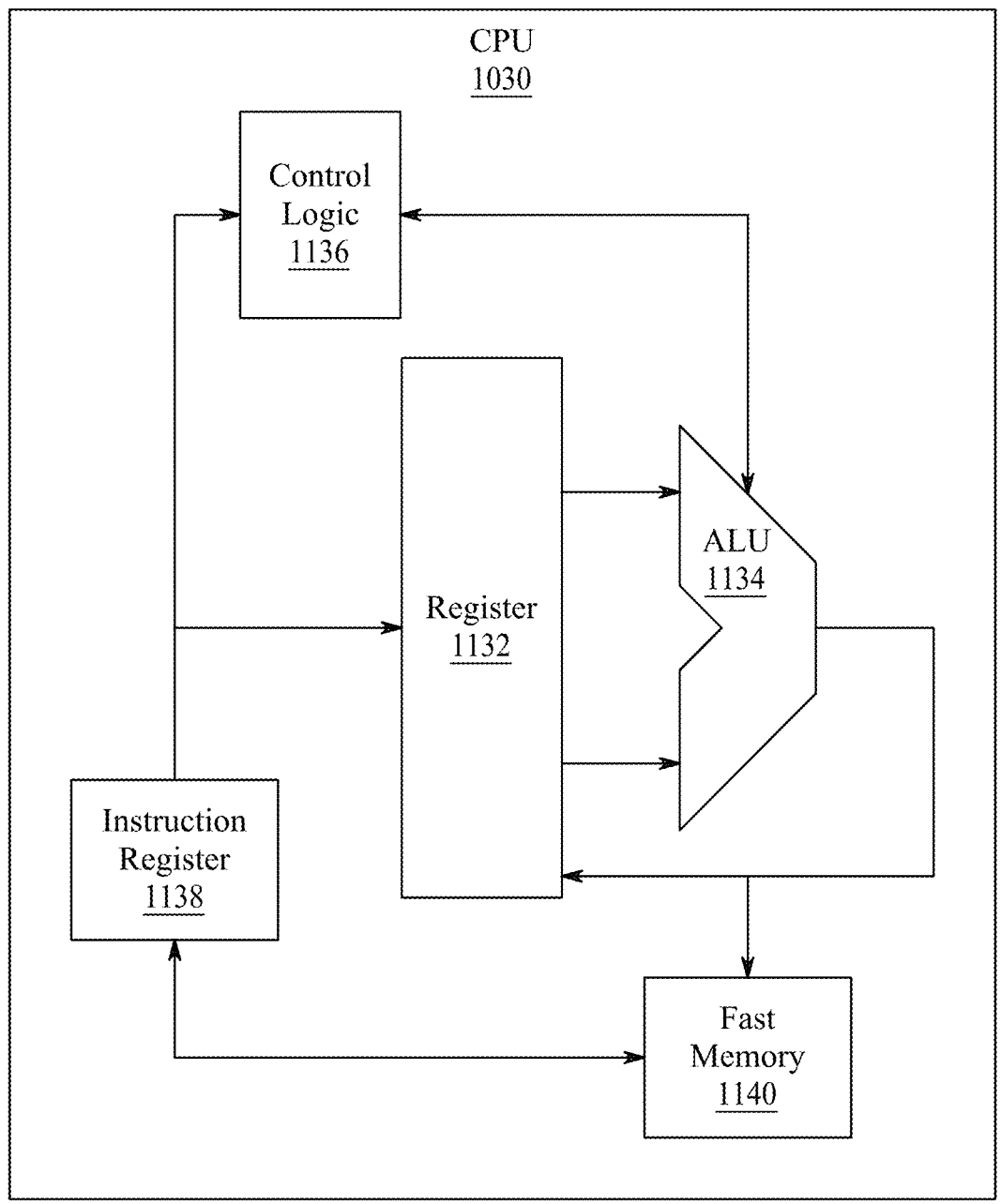
FIG. 11 is an exemplary schematic diagram of a processor used with the computing system, according to certain embodiments.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1088 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
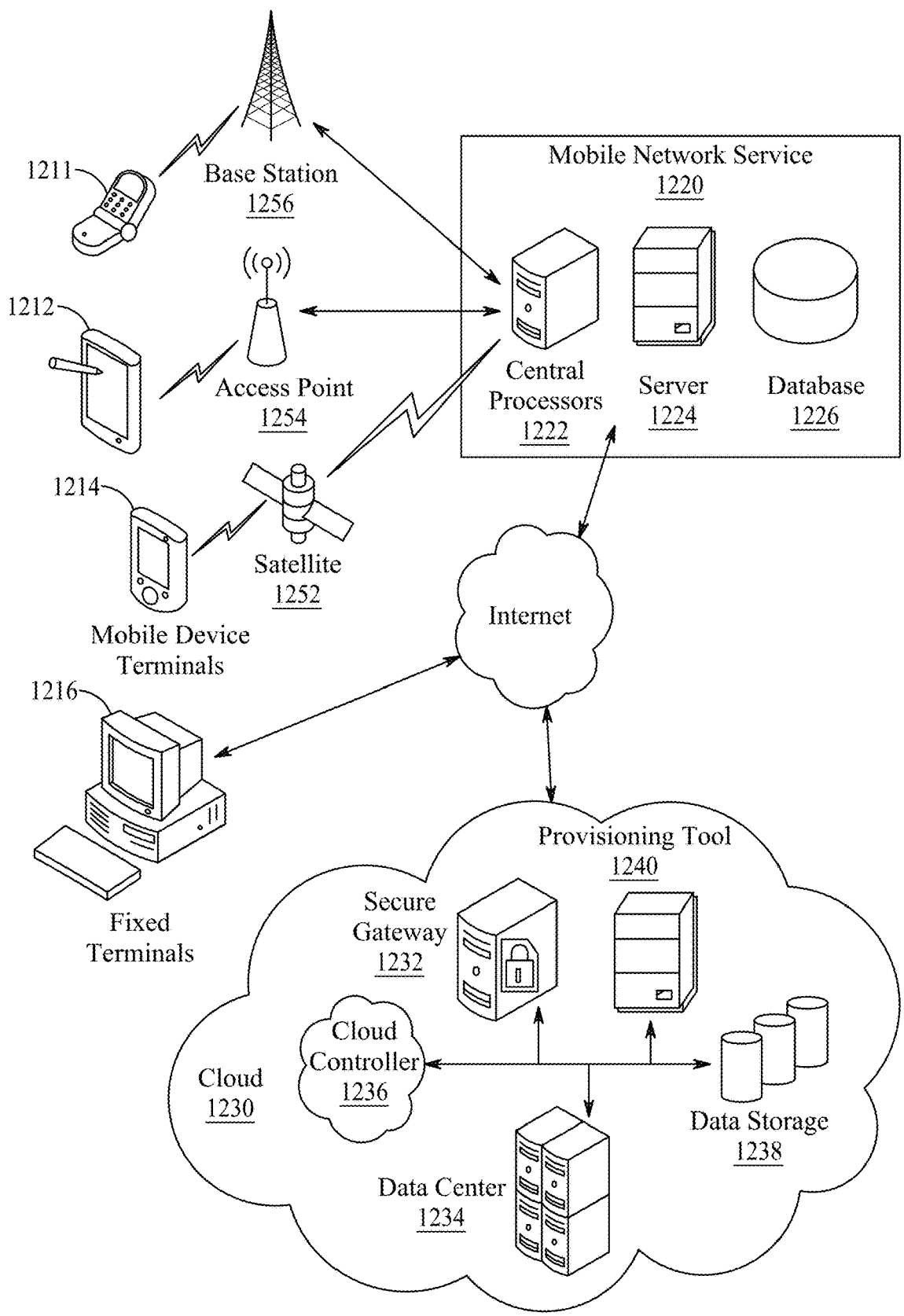
FIG. 12 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Obviously, numerous modifications and variations of the present disclosure will be apparent to the person skilled in the art in light of the above description. For example, number of fixed mass dampers may be increased to further bring improvement in dampening the vibrations. The spring constant, damper stiffness coefficients and the value of the mass may be adjusted based upon the application, such as for amplification or dampening purpose. Also, the person skilled in the art may use more than one dynamic linear spring mass damper connected to the beam to further enhance the dampening process in the beam. It is therefore to be understood that within the scope of the appended claims, the disclosure may be practiced otherwise than as specifically described herein.

The invention claimed is:

1. A dynamic damper system, comprising:
   a beam having a first fixed end, a second fixed end, a width and a thickness;
   a first flexible support connected to the beam beneath the first end, wherein the first flexible support has a linear spring constant, $k_l$;
   a second flexible support connected to the beam beneath the second end, wherein the second flexible support has the linear spring constant, $k_l$;
   a first torsional spring connected to the first end, wherein the first torsional spring has a torsional spring constant, $k_\theta$;
   a second torsional spring connected to the second end, wherein the second torsional spring has the torsional spring constant, $k_\theta$;
   a moving load configured to traverse the beam reciprocally from the first end to the second end, wherein the moving load generates first vibrations in the beam; and
   a dynamic linear spring mass damper connected to the beam, wherein the dynamic linear spring mass damper is configured to travel reciprocally between the first end and the second end, wherein the travel of the dynamic linear spring mass damper is configured to generate second vibrations in the beam which are 180 degrees out of phase with the first vibrations.

2. The dynamic damper system of claim 1, further comprising:
   a first accelerometer connected to the beam, wherein the first accelerometer is configured to measure the first vibrations generated by the moving load, and generate first vibration signals in response to the first vibrations.

3. The dynamic damper system of claim 2, further comprising:
   a track located on an underside of the beam, wherein the track extends from the first end to the second end;
   a housing surrounding the dynamic linear spring mass damper;
   a plurality of wheels attached to an upper exterior surface of the housing, wherein the wheels are configured to engage with the track;
   a motor electrically connected to the wheels, wherein the motor is configured to turn the wheels;
   a second accelerometer located within the dynamic linear spring mass damper, wherein the second accelerometer is configured to generate second vibration signals;
   a position sensor configured to measure a distance of the housing from the first end, and generate position signals;
   a spring, $s_d$, connected at a first end to an upper interior surface of the housing, wherein the spring has a spring constant, $k_d$;
   a mass, $m_d$, connected to a second end of the spring;
   a dashpot having a dashpot coefficient of stiffness, $c_d$, connected in parallel with the spring;
   a battery; and
   a microcontroller connected to the motor, the battery, the position sensor, the first accelerometer, and the second accelerometer, wherein the microcontroller is configured to calculate the speed and travel distance based on the first vibration signals, the second vibration signals and the position signals, and generate drive signals to actuate the motor based on the first vibration signals, the second vibration signals and the position signals.

4. The dynamic damper system of claim 3, wherein the drive signals are configured to control the speed and travel distance of the dynamic linear spring mass damper.

5. The dynamic damper system of claim 4, wherein the microcontroller includes a circuitry, a memory storing program instructions, and at least one processor, wherein the program instructions include a Fourier transform, and the at least one processor is configured to use the Fourier transform to transform the first vibration signals, the second vibration signals and the position signals to a frequency space.

6. The dynamic damper system of claim 5, wherein the microcontroller is further configured to calculate a force, F(x, t) of the moving load on the beam based on a weighted sum of a fourth partial derivative with respect to position of a frequency of the moving load, a first partial derivative with respect to position of the frequency of the moving load, a second partial derivative with respect to time of the moving load, a displacement of the mass due to the second vibrations multiplied by a Fourier transform of a second force, (G(x, t), on the beam generated by the second vibrations of the dynamic linear spring mass damper, and a first derivative of the displacement of the mass due to the second vibrations multiplied by the second force on the beam generated by the second vibrations of the dynamic linear spring mass damper.

7. The dynamic damper system of claim 6, wherein the force of the moving load on the beam is given by:

$$F(x, t) = \rho bh \left( \frac{EI}{\rho bh} \frac{\partial^4 \tilde{w}(x, t)}{\partial \tilde{x}^4} + \frac{c_b}{\rho bh} \frac{\partial \tilde{w}(x, t)}{\partial \tilde{x}} + \frac{\partial^2 \tilde{w}(x, t)}{\partial \tilde{t}^2} + \left( \frac{k_d}{\rho bh} \tilde{u}(t) + \frac{c_d}{\rho bh} \frac{d\tilde{u}(t)}{dt} \right) \tilde{G}(x, t) \right).$$

8. The dynamic damper system of claim 7, wherein the microcontroller is configured to calculate the speed and travel distance of the dynamic linear spring mass damper needed to dampen the vibrations based on the force, F(x, t).

9. The dynamic damper system of claim 8, wherein the drive signals are configured to actuate the wheels to rotate at a rotational speed on the track such that the dynamic linear spring mass damper moves at a velocity equal to a speed of the moving load.

10. The dynamic damper system of claim 9, wherein the drive signals are configured to actuate the wheels to rotate in a direction which moves the dynamic linear spring mass damper in a same direction of travel as the moving load.

11. The dynamic damper system of claim 9, wherein the drive signals are configured to actuate the wheels to rotate in a direction which moves the dynamic linear spring mass damper in an opposite direction of travel as the moving load.

12. The dynamic damper system of claim 9, further comprising:
a first fixed spring mass damper connected to the underside of the beam halfway between the first end and the second end, wherein the first spring mass damper is attached to a first side of the beam spaced from the track; and
a second fixed spring mass damper connected to the underside of the beam halfway between the first end and the second end, wherein the second spring mass damper is attached to a second side of the beam spaced from the track; wherein the first side is opposite the second side, wherein the first fixed spring mass damper and the second fixed spring mass damper are configured to generate third vibrations and fourth vibrations, respectively, which together dampen a fundamental frequency of the beam.

13. The dynamic damper system of claim 1, further comprising a fixed spring mass damper connected to the underside of the beam halfway between the first end and the second end, wherein the fixed spring mass damper is configured to generate third vibrations which dampen a fundamental frequency of the beam.

14. The dynamic damper system of claim 13, wherein the fixed spring mass damper includes:
a mounting plate connected to the underside of the beam;
a spring, $s_f$, connected to the mounting plate, wherein the spring has a spring constant, $k_f$;
a mass, $m_f$, connected to a second end of the spring;
an accelerometer connected to the mass, wherein the accelerometer is configured to measure a fundamental frequency of the beam;
a dashpot, $d_f$, having a dashpot coefficient of stiffness, $c_f$, connected in parallel with the spring, wherein the spring constant, $k_f$, the mass, $m_f$, and the coefficient of stiffness, $c_f$, are selected such that third vibrations of the fixed spring mass damper are 180 degrees out of phase with the fundamental frequency of the beam.

15. A method for damping vibrations in a beam traversed by a moving load, comprising:
connecting a first flexible support having a linear spring constant, $k_l$, beneath a first fixed end of the beam;
connecting a second flexible support having a linear spring constant, $k_l$, beneath a second fixed end of the beam;
connecting a first torsional spring to the first end, wherein the first torsional spring has a torsional spring constant, $k_\theta$;
connecting a second torsional spring to the second end, wherein the second torsional spring has the torsional spring constant, $k_\theta$;
connecting a housing including a dynamic linear spring mass damper to the beam;
generating, with a moving load, first vibrations in the beam; and
actuating, with a motor, the dynamic linear spring mass damper to travel reciprocally between the first end and the second end, thereby generating second vibrations in the beam which are 180 degrees out of phase with the first vibrations.

16. The method of claim 15, further comprising:
measuring, with a first accelerometer connected to a midpoint of the beam, a fundamental frequency of the beam;
connecting a fixed spring mass damper to an underside of the beam at a midpoint of the beam;
generating, with the fixed spring mass damper, third vibrations which are 180 degrees out of phase with the fundamental frequency;
attaching a track to the underside of the beam, wherein the track extends from the first end to the second end;
attaching a plurality of wheels to an upper exterior surface of the dynamic linear spring mass damper housing, wherein the wheels are configured to engage with the track;
installing the wheels on the track;
installing a motor in the dynamic linear spring mass damper housing;
connecting the motor to the wheels;
installing a battery in the dynamic linear spring mass damper housing; and
generating, with a microcontroller connected to the motor and the battery, drive signals to actuate the motor.

17. The method of claim 16, further comprising:
installing a position sensor in the dynamic linear spring mass damper housing;

measuring, with the position sensor, a distance of the dynamic linear spring mass damper housing from the first end, and generating position signals;

installing a second accelerometer in the dynamic linear spring mass damper housing, wherein the second accelerometer is connected to the dynamic linear spring mass damper, and generating second vibration signals;

calculating, by the microcontroller, the speed and travel distance based on the first vibration signals, the second vibration signals and the position signals; and generating, by the microcontroller, the drive signals based on the first vibration signals, the second vibration signals and the position signals.

18. The method of claim 17, further comprising:
actuating, by the microcontroller, the wheels to rotate in a direction which moves the dynamic linear spring mass damper in one of a same direction of travel as the moving load and an opposite direction of travel as the moving load.

19. The method of claim 15, further comprising:
calculating, by the microcontroller, a force, $F(x, t)$ of the moving load on the beam based on a weighted sum of a fourth partial derivative with respect to position of a frequency of the moving load, a first partial derivative with respect to position of a frequency of the moving load, a second partial derivative with respect to time of the moving load, a displacement of the mass due to the second vibrations multiplied by a Fourier transform of a second force, $(G(x, t)$, on the beam generated by the second vibrations of the dynamic linear spring mass damper, and a first derivative of the displacement of the mass due to the second vibrations multiplied by the second force on the beam generated by the second vibrations of the dynamic linear spring mass damper; and calculating the speed and travel distance of the dynamic linear spring mass damper needed to dampen the vibrations based on the force, $F(x, t)$.

20. A non-transitory computer readable medium having program instructions stored therein that, when executed by one or more processors, cause the one or more processors to perform a method for damping vibrations in a beam traversed by a moving load, comprising:

receiving first vibration signals generated by a first accelerometer connected to the beam;

connecting a dynamic linear spring mass damper to the beam;

receiving second vibration signals generated by a second accelerometer of the dynamic linear spring mass damper;

receiving position signals from a position sensor connected to a housing of the dynamic linear spring mass damper;

Fourier transforming the first vibration signals, the second vibration signals and the position signals to a frequency space;

calculating a force, $F(x, t)$ of the moving load on the beam based on a weighted sum of a fourth partial derivative with respect to position of a frequency of the moving load, a first partial derivative with respect to position of the frequency of the moving load, a second partial derivative with respect to time of the frequency of the moving load, a displacement of a mass of the dynamic linear spring mass damper due to the second vibrations multiplied by a Fourier transform of a second force, $(G(x, t))$, on the beam generated by the second vibrations of the dynamic linear spring mass damper, and a first derivative of the displacement of the mass due to the second vibrations multiplied by the second force on the beam generated by the second vibrations of the a dynamic linear spring mass damper; and calculating the speed and travel distance of the dynamic linear spring mass damper needed to dampen the vibrations based on the force, $F(x, t)$.

* * * * *